US008233665B2

(12) United States Patent
Nakatsukasa

(10) Patent No.: US 8,233,665 B2
(45) Date of Patent: Jul. 31, 2012

(54) IMAGE MEASURING APPARATUS AND COMPUTER PROGRAM

(75) Inventor: Takashi Nakatsukasa, Osaka (JP)

(73) Assignee: Keyence Corporation, Osaka (JP)

( * ) Notice: Subject to any disclaimer, the term of this patent is extended or adjusted under 35 U.S.C. 154(b) by 451 days.

(21) Appl. No.: 12/628,430

(22) Filed: Dec. 1, 2009

(65) Prior Publication Data

US 2010/0189308 A1  Jul. 29, 2010

(30) Foreign Application Priority Data

Jan. 23, 2009  (JP) ................................. 2009-013346

(51) Int. Cl.
G06K 9/00 (2006.01)
G01N 23/00 (2006.01)

(52) U.S. Cl. .......................... 382/106; 382/199; 250/311

(58) Field of Classification Search .................. 382/100, 382/103, 106–107, 128–134, 140, 154, 162, 382/168, 173, 181, 189–194, 199, 203, 232, 382/254, 276, 286–299, 305, 312, 321, 152; 250/306, 310, 311; 438/689
See application file for complete search history.

(56) References Cited

U.S. PATENT DOCUMENTS

| 7,230,239 | B2 * | 6/2007 | Tanaka et al. ................. 250/306 |
| 7,411,191 | B2 * | 8/2008 | Nakasuji et al. .............. 250/310 |
| 7,499,584 | B2 * | 3/2009 | Delaney ........................ 382/152 |
| 2001/0040995 | A1 * | 11/2001 | Takada et al. ................ 382/152 |
| 2005/0048780 | A1 * | 3/2005 | Tanaka et al. ................ 438/689 |

FOREIGN PATENT DOCUMENTS

| JP | 11-32740 | * | 5/1999 |
| JP | 11-132740 |  | 5/1999 |

* cited by examiner

Primary Examiner — Seyed Azarian
(74) Attorney, Agent, or Firm — Kilyk & Bowersox, P.L.L.C.

(57) ABSTRACT

An image of a measurement object is displayed, and specification of a feature image and a measurement position is received on the displayed image. The feature image, the specification has been received, and information on relative positions for the feature image, which represents the measurement position and a display position of a dimension line, are stored. A newly acquired image of the measurement object is compared with the feature image to identify information on the attitude and the position of the image of the measurement object. A measurement position is set for the image of the measurement object with the identified attitude and position, and then predetermined physical quantities are measured. Based on the stored information on the relative position for the feature image displaying the dimension line, a dimension line indicating a measurement position and a measurement result are displayed at predetermined positions.

16 Claims, 18 Drawing Sheets

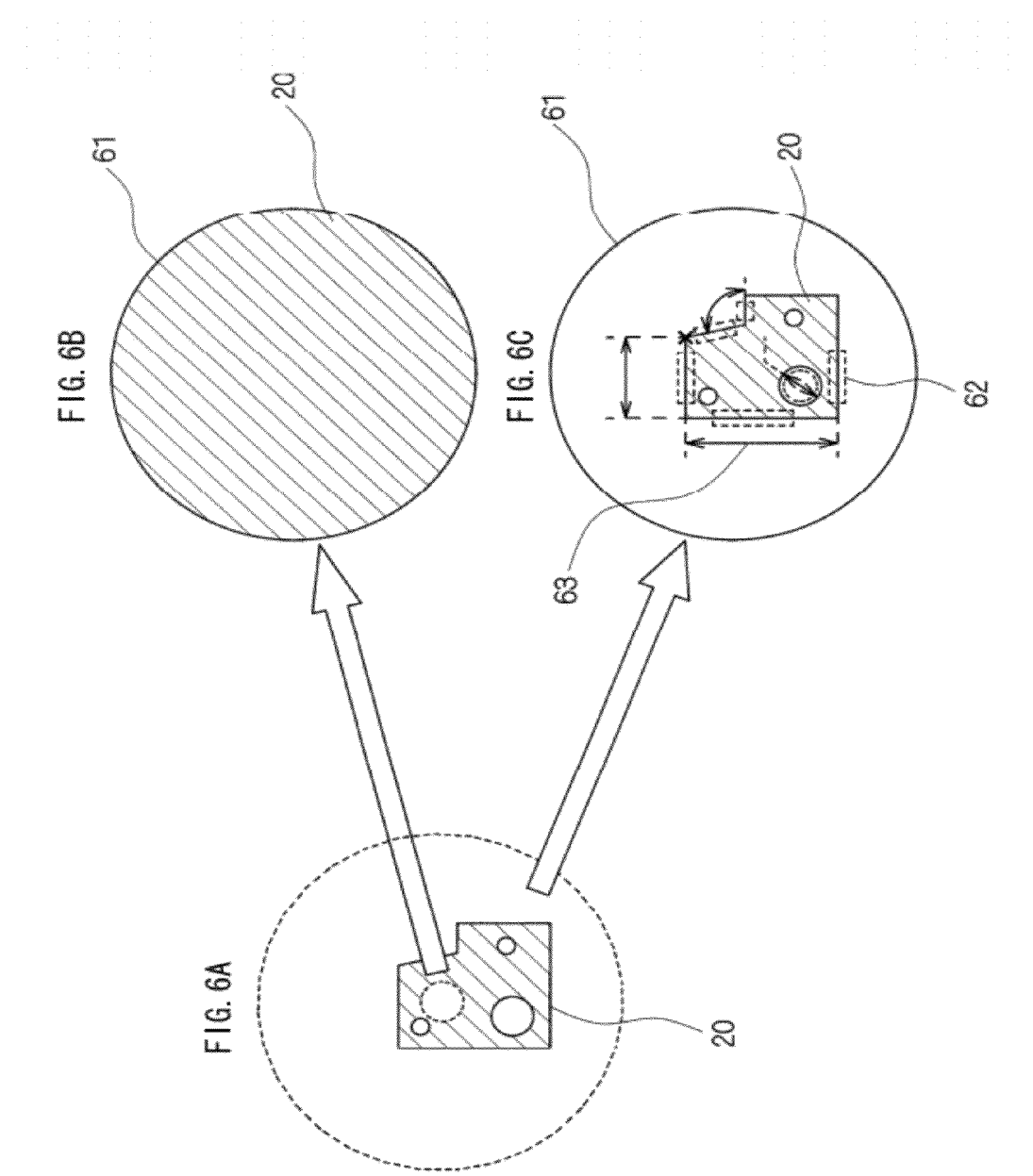

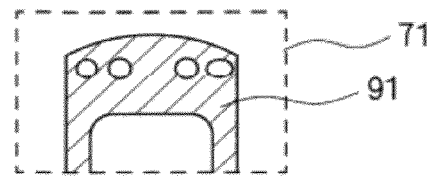
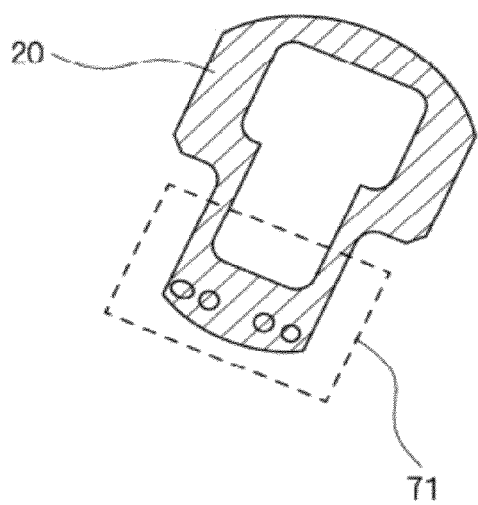

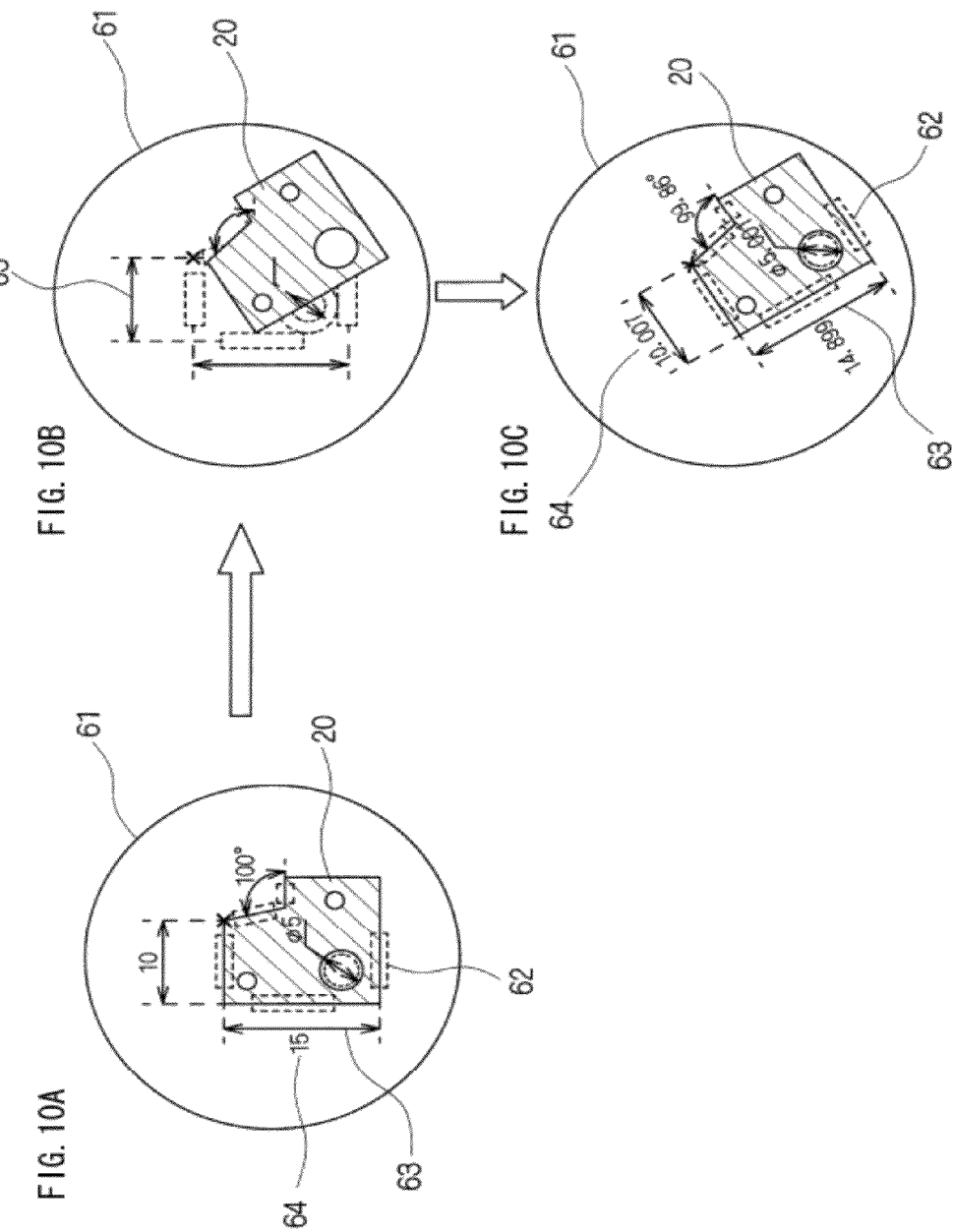

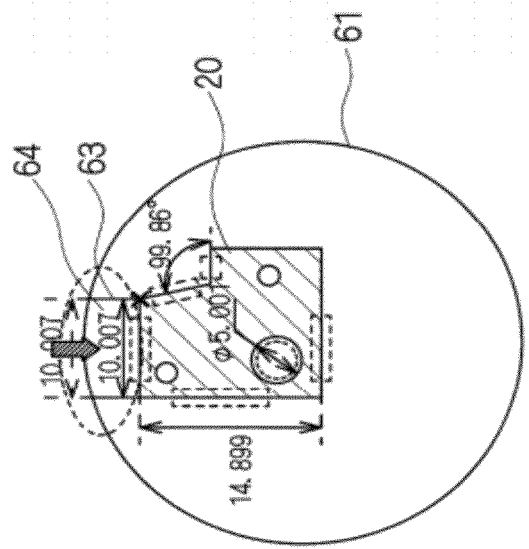
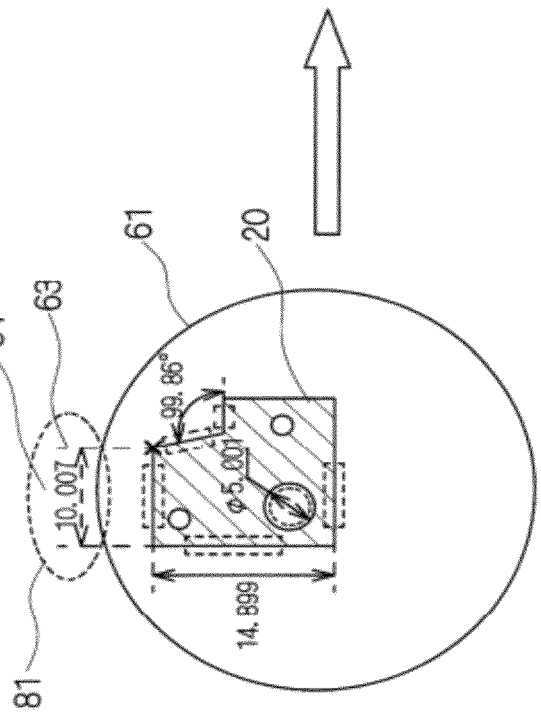

STRAIGHT LINE OBTAINED BY METHOD OF LEAST SQUARES

CIRCLE OBTAINED BY METHOD OF LEAST SQUARES

IMAGE MEASURING APPARATUS AND COMPUTER PROGRAM

CROSS-REFERENCE TO RELATED APPLICATIONS

The present application claims foreign priority based on Japanese Patent Application No. 2009-013346, filed Jan. 23, 2009, the contents of which is incorporated herein by reference.

BACKGROUND OF THE INVENTION

1. Field of the Invention

The present invention relates to an image measuring apparatus and a computer program that allow measurement results to be displayed such that the measurement results are easily visible without depending on a state where a measurement object is mounted.

2. Description of the Related Art

As an apparatus for measuring a shape of a measurement object, a number of image measuring apparatuses have been developed. Such an image apparatus applies light to a measurement object, acquires an image by image formation of transmitted light or reflected light of the applied light on an imaging device, such as a CCD (charge coupled device) and CMOS (complementary metal-oxide semiconductor), through a light receiving lens, and performs computing of the acquired image, thereby measuring the shape of the measurement object.

The image of a measurement object becomes extremely accurately similar to the measurement object with the aid of a light receiving lens. By calibrating the dimensions of the image by using a magnification of the light receiving lens, the dimensions of an actual measurement object can be measured based on the dimensions of the image. Accordingly, accurately identifying the shape of a measurement object appearing on an image enables the shape of an actual measurement object to be accurately measured. The shape of a measurement object on an image is identified by detecting the boundary portion (hereinafter referred to as an "edge portion") between the measurement object and the background image on the image. FIG. 17 shows an example of a conventional edge detection area specified on an image. FIG. 18 shows an example of a shape identified by using a method of least squares based on conventional edge points. FIG. 19 is a schematic view for illustrating a circle obtained by fitting conventional edge points to a geometrical figure.

When detecting edges on an image, a periphery of an edge portion is surrounded by clicking or dragging it with a pointing device, such as a mouse, to specify an edge detection area as shown in FIG. 17. The edge portion is a part with a sharp change in luminance value between the pixel of a measurement object and the pixel of a background image. A computer acquires, for example, a part (between pixels) with a luminance difference between adjacent pixels larger than a predetermined value in image data in the specified area, as a plurality of edge points shown in FIG. 17. The plurality of acquired edge points are fitted to a geometrical figure, such as a straight line, by using a regression analysis method, such as a method of least squares, as shown in FIG. 18. For example, the straight line to which the edge points are fitted is detected as an edge. Even if points constitute a straight line, the points can be detected likewise. For a circular shape, like a straight line, a part with a sharp change in luminance value positioned between adjacent pixels is acquired as a plurality of edge points, and the plurality of acquired edge points are fitted to a geometrical figure by using a method of least squares or the like. For example, a circle to which the edge points are fitted can be detected as an edge as shown in FIG. 19.

A size of a measurement object itself and a size of a measurement object part are various. Accordingly, if a measurement object having a hand-held size (size from several millimeters to about 100 mm square) is measured with a measuring device having the field of view of only a few millimeters square, the entire image of a measurement object cannot be collectively grasped. In this case, for example, an XY stage and the like are moved to relatively move a measurement object with respect to the field of view, so that a necessary portion is within the field of view, and thereafter measurement is performed, which is disclosed in Japanese Unexamined Patent Publication No. 11-132740.

For example, when the distance between two straight lines that are not within the same field of view is measured, first, one straight line edge is specified, and then an XY stage is moved and the other straight line edge is specified. The distance between the specified straight line edges is measured by calculating from the position in the displayed image and the movement amount of the XY stage.

It is difficult in the image measuring apparatus to grasp what measured value of what part of the measurement object is represented by the measurement result. Conventionally, for example as disclosed in Japanese Unexamined Patent Publication No. 11-132740, an image of a measurement object is displayed on a display screen, and dimension lines in accordance with measurement places specified for measurement of geometrical dimensions are also displayed. In this manner, a user can easily confirm the measurement result with the displayed geometrical dimensions.

In conventional image measuring apparatuses including Japanese Unexamined Patent Publication No. 11-132740, if a measurement object is within the field of view, a user can easily grasp what measured value of what part of the measurement object is represented by the measurement result. However, if the measurement object is not within the field of view, the entire image of the measurement object cannot be displayed. This makes it difficult to grasp what part of the measurement object is represented by a measured value and how the part is measured for obtaining the measured value. Therefore, there has been a problem that it is difficult for a user to intuitively grasp a measured portion.

For example, there is an apparatus in which a detected edge portion is displayed on a screen other than that for a measurement object, so that dimension lines and a measurement result are displayed on individual screens. However, the entire image of a measurement object cannot be displayed, which is the same as other conventional image measuring apparatuses. This apparatus is not different from other conventional image measuring apparatuses in that it is difficult to grasp what part of a measurement object is represented by a measured value and how the part is measured for obtaining the measured value if the shape of the measurement object is complicated.

SUMMARY OF THE INVENTION

In view of such circumstances, an object of the present invention is to provide an image measuring apparatus and a computer program to allow a user to accurately grasp what part of a measurement object is represented by a measured value of a measurement result and to allow a user to visually confirm what part of the measurement object is designated by the measurement result without depending on the attitude, position and other conditions of an image of the measurement object.

In order to achieve the above-described object, according to a first aspect of the present invention, there is provided an image measuring apparatus including: an imaging unit disposed facing a stage for mounting the measurement object and configured to acquire an image of a measurement object; a displaying unit configured to display the image of the measurement object acquired in the imaging unit; a feature image specification receiving unit configured to receive specification of any partial image on the displayed image as a feature image; a measurement position specification receiving unit configured to receive specification of a measurement position of the measurement object, on the displayed image; a relative position storing unit configured to store the feature image the specification of which is received in the feature image specification receiving unit, and information on a relative position for the feature image, the information representing the measurement position the specification of which is received in the measurement position specification receiving unit and a display position for displaying a dimension line indicating the measurement position; an attitude and position identifying unit configured to compare an image of the measurement object, the image being newly acquired by the imaging unit, with the stored feature image to identify information on an attitude and a position of the newly acquired image of the measurement object; an edge portion detecting unit configured to set a measurement position for the image of the measurement object, the image having the attitude and the position identified, based on the information on the relative position of the measurement position for the feature image, the information being stored in the relative position storing unit, and to detect an edge portion at the measurement position; a measuring unit configured to measure a predetermined physical quantity based on the detected edge portion; and a measurement result displaying unit configured to display the dimension line indicating the measurement position and a measurement result at a predetermined position based on the information on the relative position for the feature image stored in the relative position storing unit, the information representing the display position of the dimension line.

According to a second aspect of the present invention, in the image measuring apparatus according to the first aspect, the relative position storing unit is configured to further store a display position for displaying the measurement result as the information on the relative position for the feature image, and the measurement result displaying unit is configured to display the measurement result at the predetermined position based on the information on the relative position of the display position for displaying the measurement result for the feature image, the information being stored in the relative position storing unit.

According to a third aspect of the present invention, the image measuring apparatus according to the first or second aspect, further includes: a display position changing unit configured to receive a change of the position for displaying the dimension line and/or the measurement result.

According to a fourth aspect of the present invention, the image measuring apparatus according to any one of the first to third aspects, further includes: a measurement result specification receiving unit configured to receive specification of the measurement result to be an object of determination of whether the measurement result is within a range of a predetermined tolerance; and a display manner changing unit configured to change a display manner of the measurement result the specification of which is received in the measurement result specification receiving unit.

According to a fifth aspect of the present invention, the image measuring apparatus according to the fourth aspect, further includes a measurement result determining unit configured to determine whether the measurement result the specification of which is received in the measurement result specification receiving unit is within the range of the predetermined tolerance; and wherein the display manner changing unit is configured to change the display manner of the measurement result if it is determined in the measurement result determining unit that the measurement result is within the range of the predetermined tolerance.

According to a sixth aspect of the present invention, the image measuring apparatus according to any one of the first to fifth aspects, further includes a display state determining unit configured to determine whether a portion displayed outside a display range exists in the measurement result; and wherein the measurement result displaying unit is configured to move the display position of the measurement result into the display range so that the measurement result is displayed within the display range, if it is determined in the display state determining unit that the portion displayed outside the display range exists.

According to a seventh aspect of the present invention, the image measuring apparatus according to any one of the first to sixth aspects, further includes: a display angle detecting unit configured to detect an inclined angle of the display position of the measurement result; and an inclined angle determining unit configured to determine whether the detected inclined angle is equal to or greater than a predetermined angle; and wherein the measurement result displaying unit is configured to display the measurement result in an upside-down manner if it is determined in the inclined angle determining unit that the inclined angle is equal to or greater than the predetermined angle.

According to an eighth aspect of the present invention, the image measuring apparatus according to the first aspect, further includes a measurement result display position storing unit configured to store information on a relative position for the image of the measurement object, the information representing a display position of the displayed dimension line indicating the measurement position and the measurement result, in association with the attitude and the position of the image of the measurement object; and wherein the measurement result displaying unit is configured to change and display the information on the attitude and the position of the image of the measurement object identified in the attitude and position identifying unit based on the information on the relative position for the image of the measurement object stored in the measurement result display position storing unit, the information representing the display position of the dimension line and the measurement result.

In order to achieve the above-mentioned object, according to a ninth aspect of the present invention, there is provided a computer program executable with an image measuring apparatus, the computer program causing a computer to realize a function of the image measuring apparatus, the image measuring apparatus including: an imaging unit disposed facing a stage for mounting the measurement object and configured to acquire an image of a measurement object; a displaying unit configured to display the image of the measurement object acquired in the imaging unit; a feature image specification receiving unit configured to receive specification of any partial image on the displayed image as a feature image; a measurement position specification receiving unit configured to receive specification of a measurement position of the measurement object, on the displayed image; a relative position storing unit configured to store the feature image the specification of which is received in the feature image specification receiving unit, and information on a relative position for the feature image, the information representing the measurement position the specification of which is received in the measurement position specification receiving unit and a display position for displaying a dimension line indicating the measurement position; an attitude and position identifying unit configured to compare an image of the measurement object, the image being newly acquired by the imaging unit, with the stored feature image to identify information on an attitude and a position of the newly acquired image of the measurement object; an edge portion detecting unit configured to set a measurement position for the image of the measurement object, the image having the attitude and the position identified, based on the information on the relative position of the measurement position for the feature image, the information being stored in the relative position storing unit, and to detect an edge portion at the measurement position; a measuring unit configured to measure a predetermined physical quantity based on the detected edge portion; and a measurement result displaying unit configured to display the dimension line indicating the measurement position and a measurement result at a predetermined position based on the information on the relative position for the feature image stored in the relative position storing unit, the information representing the display position of the dimension line.

According to a tenth aspect of the present invention, in the computer program according to the ninth aspect, the computer program causing the computer to realize the function of the image measuring apparatus, the relative position storing unit is configured to further store a display position for displaying the measurement result as the information on the relative position for the feature image, and the measurement result displaying unit is configured to display the measurement result at the predetermined position based on the information on the relative position of the display position for displaying the measurement result for the feature image, the information being stored in the relative position storing unit.

According to an eleventh aspect of the present invention, in the computer program according to the ninth or tenth aspect, the computer program causing the computer to realize the function of the image measuring apparatus, the image measuring apparatus further includes: a display position changing unit configured to receive a change of the position for displaying the dimension line and/or the measurement result.

According to a twelfth aspect of the present invention, in the computer program according to any one of the ninth to eleventh aspects, the computer program causing the computer to realize the function of the image measuring apparatus, the image measuring apparatus further includes: a measurement result specification receiving unit configured to receive specification of the measurement result to be an object of determination of whether the measurement result is within a range of a predetermined tolerance; and a display manner changing unit configured to change a display manner of the measurement result the specification of which is received in the measurement result specification receiving unit.

According to a thirteenth aspect of the present invention, in the computer program according to the twelfth aspect, the computer program causing the computer to realize the function of the image measuring apparatus, the image measuring apparatus further includes: a measurement result determining unit configured to determine whether the measurement result the specification of which is received in the measurement result specification receiving unit is within the range of the predetermined tolerance; and wherein the display manner changing unit is configured to change the display manner of the measurement result if it is determined in the measurement result determining unit that the measurement result is within the range of the predetermined tolerance.

According to a fourteenth aspect of the present invention, in the computer program according to any one of the ninth to thirteenth aspect, the computer program causing the computer to realize the function of the image measuring apparatus, the image measuring apparatus further includes: a display state determining unit configured to determine whether a portion displayed outside a display range exists in the measurement result; and wherein the measurement result displaying unit is configured to move the display position of the measurement result into the display range so that the measurement result is displayed within the display range, if it is determined in the display state determining unit that the portion displayed outside the display range exists.

According to a fifteenth aspect of the present invention, in the computer program according to any one of the ninth to fourteenth aspects, the computer program causing the computer to realize the function of the image measuring apparatus, the image measuring apparatus further includes: a display angle detecting unit configured to detect an inclined angle of the display position of the measurement result; and an inclined angle determining unit configured to determine whether the detected inclined angle is equal to or greater than a predetermined angle; and wherein the measurement result displaying unit is configured to display the measurement result in an upside-down manner if it is determined in the inclined angle determining unit that the inclined angle is equal to or greater than the predetermined angle.

According to a sixteenth aspect of the present invention, in the computer program according to the ninth aspect, the computer program causing the computer to realize the function of the image measuring apparatus, the image measuring apparatus further includes: a measurement result display position storing unit configured to store information on a relative position for the image of the measurement object, the information representing a display position of the displayed dimension line indicating the measurement position and the measurement result, in association with the attitude and the position of the image of the measurement object; and wherein the measurement result displaying unit is configured to change and display the information on the attitude and the position of the image of the measurement object identified in the attitude and position identifying unit based on the information on the relative position for the image of the measurement object stored in the measurement result display position storing unit, the information representing the display position of the dimension line and the measurement result.

According to the first and ninth aspects of the present invention, an image of a measurement object that is obtained in an imaging unit is displayed, specification of any partial image on the displayed image as a feature image is received, and specification of a measurement position of the measurement object is received. The feature image the specification of which is received and information on a relative position for the feature image are stored. This information represents a measurement position and a display position for displaying a dimension line indicating the measurement position. An image of the measurement object newly acquired by the imaging unit is compared with the stored feature image to specify information on an attitude and a position of the newly acquired image of the measurement object. Based on the stored information on the relative position of the measurement position for the feature image, a measurement position is set for the image of the measurement object for which the attitude and the position are specified, and an edge portion at the measurement position is detected, and then a predetermined physical quantity is measured. Based on the stored information on the relative position for the feature image, the information representing the display position of the dimension line, a dimension line indicating the measurement position and a measurement result are displayed at a predetermined position. Storing the feature image, the specification of which is received, and the information on the relative position for the feature image, which represents the measurement position and the display position for displaying the dimension line indicating the measurement position, allows the image of the measurement object and the feature image to be compared. This makes it possible to determine the attitude and the position of the image of the measurement object, and the measurement position and the display position for displaying the dimension line indicating the measurement position as the relative position for the image of the measurement object. Accordingly, a user can visually confirm what portion of the measurement object corresponds to the measurement result without depending on the attitude, the position and the like of the image of the measurement object.

According to the second and tenth aspects of the present invention, a display position for displaying the measurement result may be further stored as the information on the relative position for the feature image, and the measurement result may be displayed at the predetermined position based on the information on the relative position of the display position for displaying the measurement result for the feature image. Regarding display of the measurement result, its position can thus be changed according to an image of the measurement object without depending on the attitude, the position and the like of the image of the measurement object, and therefore a user can visually confirm what portion of the measurement object corresponds to the measurement result.

According to the third and eleventh aspects of the present invention, a change of the position for displaying the dimension line and/or the measurement result may be received. Even when the displayed position of the dimension line and/or the measurement result is outside the field of view, the displayed position can thus be changed so as to be within the field of view. Therefore, a user can visually confirm what portion of the measurement object corresponds to the measurement result.

According to the fourth and twelfth aspects of the present invention, specification of the measurement result to be an object of determination of whether the measurement result is within the range of a predetermined tolerance may be received, and the display manner of the measurement result the specification of which is received may be changed. The measurement result to be an object of determination of whether the measurement result is within the range of the predetermined tolerance can be easily confirmed with a difference of the display manner. Accordingly, it is possible to visually confirm the measurement result for which accuracy is required so as to be within the range of tolerance.

According to the fifth and thirteenth aspects of the present invention, it may be determined whether the measurement result the specification of which is received is within the range of the predetermined tolerance, and the display manner of the measurement result may be changed if it is determined that the measurement result is within the range of the predetermined tolerance. Whether the measurement result is within a certain range considered to be appropriate can thus be easily confirmed with the display manner of the measurement result. Accordingly, an appropriate measurement result and an inappropriate measurement result can be visually confirmed. This makes it possible to easily confirm what portion of the measurement object has an inappropriate measurement result, and therefore remeasurement is made easier.

According to the sixth and fourteenth aspects of the present invention, if a portion displayed outside a display range exists in the measurement result, the display position of the measurement result is moved into the display range so that the measurement result is displayed within the display range. This enables the display of the measurement result to be visually confirmed with reliability.

According to the seventh and fifteenth aspects of the present invention, an inclined angle of the display position of the measurement result may be detected, and the measurement result may be displayed in an upside-down manner if the detected inclined angle is equal to or greater than a predetermined angle. This allows the measurement result to be visually confirmed even if the measurement object is mounted at any angle on the stage.

According to the eighth and sixteenth aspects of the present invention, information on a relative position for the image of the measurement object, the information representing the displayed dimension line indicating the measurement position and the display position of the measurement result, may be stored in association with the attitude and the position of the image of the measurement object, and the identified information on the attitude and the position of the image of the measurement object may be changed and displayed based on the stored information on the relative position for the image of the measurement object, the information representing the dimension line and the display position of the measurement result. The measurement object can therefore be rotated and displayed in accordance with the display position based on the stored information on the dimension line and the position of the measurement result, even if the measurement object is mounted at any angle on the stage.

With the above-described configuration, the feature image, the specification of which is received, and the information on the relative position for the feature image, which represents the measurement position and the display position for displaying the dimension line indicating the measurement position, are stored. The image of the measurement object and the feature image can therefore be compared. This makes it possible to determine the attitude and the position of the image of the measurement object, and the measurement position and the display position for displaying the dimension line indicating the measurement position as the relative position for the image of the measurement object. Accordingly, a user can visually confirm what portion of the measurement object corresponds to the measurement result without depending on the attitude, the position and the like of the image of the measurement object.

BRIEF DESCRIPTION OF THE DRAWINGS

FIGS. 6A to 6C are schematic views showing a relationship between an image of a measurement object and a range of a field of view and a relationship between the measurement object and a display position of the measurement result;

FIGS. 9A and 9B show an example of a matching process between the feature image and an image of measurement object;

FIGS. 10A to 10C are schematic views showing a way of displaying measurement positions and dimension lines;

FIGS. 11A and 11B are schematic views for illustrating a way of changing display positions of a dimension line and/or a measurement result when the measurement result protrudes outside a display range;

DETAILED DESCRIPTION OF THE PREFERRED EMBODIMENTS

An image measuring apparatus according to embodiments of the present invention will be described in detail below with reference to the accompanying drawings.

First Embodiment

Figure 1:
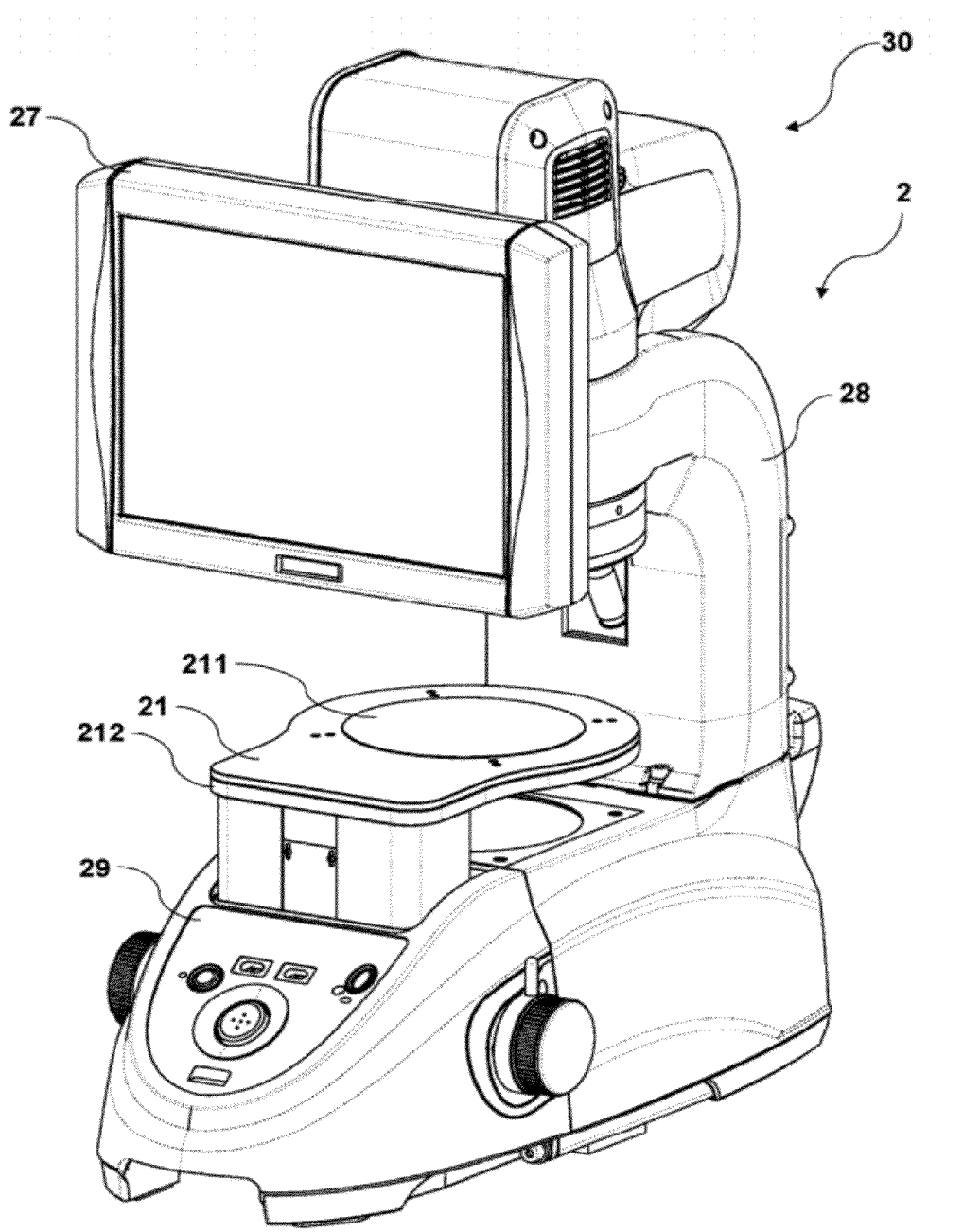
FIG. 1 is a perspective view showing a main body of an image measuring apparatus according to a first embodiment of the present invention.
Figure 2:
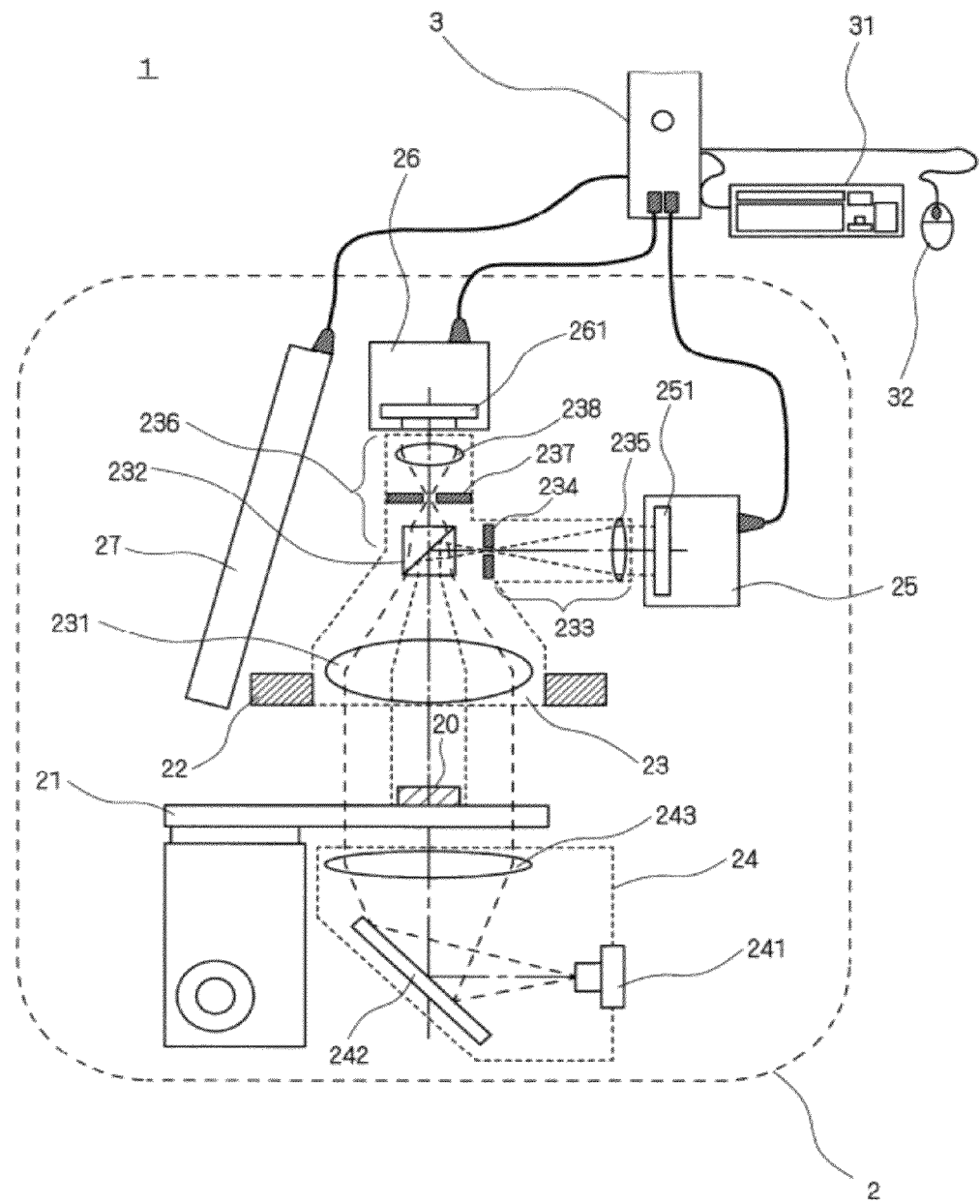
FIG. 2 is a schematic view showing a configuration of the image measuring apparatus according to the first embodiment of the present invention.

FIG. 1 is a perspective view showing a main body 2 of an image measuring apparatus according to a first embodiment of the present invention, and FIG. 2 is a schematic view showing a configuration of an image measuring apparatus 1 according to the first embodiment of the present invention. As shown in FIG. 2, the image measuring apparatus 1 according to the first embodiment includes the main body 2 and a control unit 3. Image data is obtained by image formation in the main body 2, and the obtained image data is computed in the control unit 3, thereby measuring dimensions and the like of a desired shape of the image.

As shown in FIG. 1, the main body 2 includes a stage 21 having a mounting section 211. In the mounting section 211, light is transmitted through the vicinity of the center portion. The stage 21 is connected to the main body 2 with a supporting portion 212 interposed therebetween such that the stage 21 can be rotated around the mounting section 211. By mounting a measurement object 20 on the mounting section 211 and receiving specification of a desired operation with an operation panel 29, the measurement object 20 is imaged by a imaging part 30 disposed above an arm 28, and the measurement result is displayed on a display 27.

As shown in FIG. 2, two sets of illuminating systems 22 and 24 are disposed on either side of a stage 21 for moving the mounted measurement object 20. The ring-shaped epi-illuminating system 22, which illuminates the measurement object 20 of the stage 21 from the above, is provided in a light receiving lens unit 23. Light applied by the epi-illuminating system 22 is reflected from the surface of the measurement object 20, and is returned to the light receiving lens unit 23. This permits irregularities, a pattern and the like of the surface of the measurement object 20 to be imaged.

A transmission illuminating system 24, which illuminates the measurement object 20 from the below, is disposed under the stage 21. The transmission illuminating system 24 includes at least a light source 241, a reflecting mechanism 242 and a lens 243. Light applied from the light source 241 is reflected from the reflecting mechanism 242 toward the stage 21. Through the lens 243, the light is converted into parallel light rays in a direction approximately perpendicular to the stage 21. In this way, it is possible to perform imaging in which light is transmitted only through a position without the measurement object 20.

The light receiving lens unit 23 includes at least a light receiving lens 231, a beam splitter 232, a high-magnification-side image formation lens part 233 and a low-magnification-side image formation lens part 236. The high-magnification-side image formation lens part 233 includes a slit 234 for image formation and a high-magnification-side image formation lens 235, and the low-magnification-side image formation lens part 236 includes a slit 237 for image formation and a low-magnification-side image formation lens 238. The beam splitter 232 is a prism to cause light from the light receiving lens 231 to branch in two directions. For example, cubic-type and plate-type beam splitters may be used. Light passing through a cubic-type beam splitter is never refracted, and therefore the optical axis does not deviate and alignment adjustment of a branch angle is easy. Thus, a cubic-type beam splitter is preferable compared to a plate-type beam splitter.

FIG. 2 shows an example in which light applied from the epi-illuminating system 22 guides light reflected from the measurement object 20 and light applied from the transmission illuminating system 24 and transmitted through the measurement object 20 to the high-magnification-side image formation lens part 233 and the low-magnification-side image formation lens part 236. Light rays in two directions obtained by branching by the beam splitter 232 are guided to both the low-magnification-side image formation lens part 236 and the high-magnification-side image formation lens part 233.

The high-magnification-side imaging apparatus 25 performs image formation of light guided to the high-magnification-side image formation lens part 233 using the imaging device 251, such as a CCD or CMOS, and transmits the resultant image as high magnification image data to the control unit 3. Likewise, a low-magnification-side imaging apparatus 26 performs image formation of light guided to the low-magnification-side image formation lens part 236 using an imaging device 261, such as a CCD or CMOS, and transmits the resultant image as low magnification image data to the control unit 3. With the above configuration of two-branch optical system using the light receiving lens 231 and the beam splitter 232, high magnification image data and low magnification image data can be simultaneously acquired without mechanically switching the optical system. Both high and low image data can be electronically switched and displayed on one screen, and can be individually displayed simultaneously on two screens.

Figure 3:
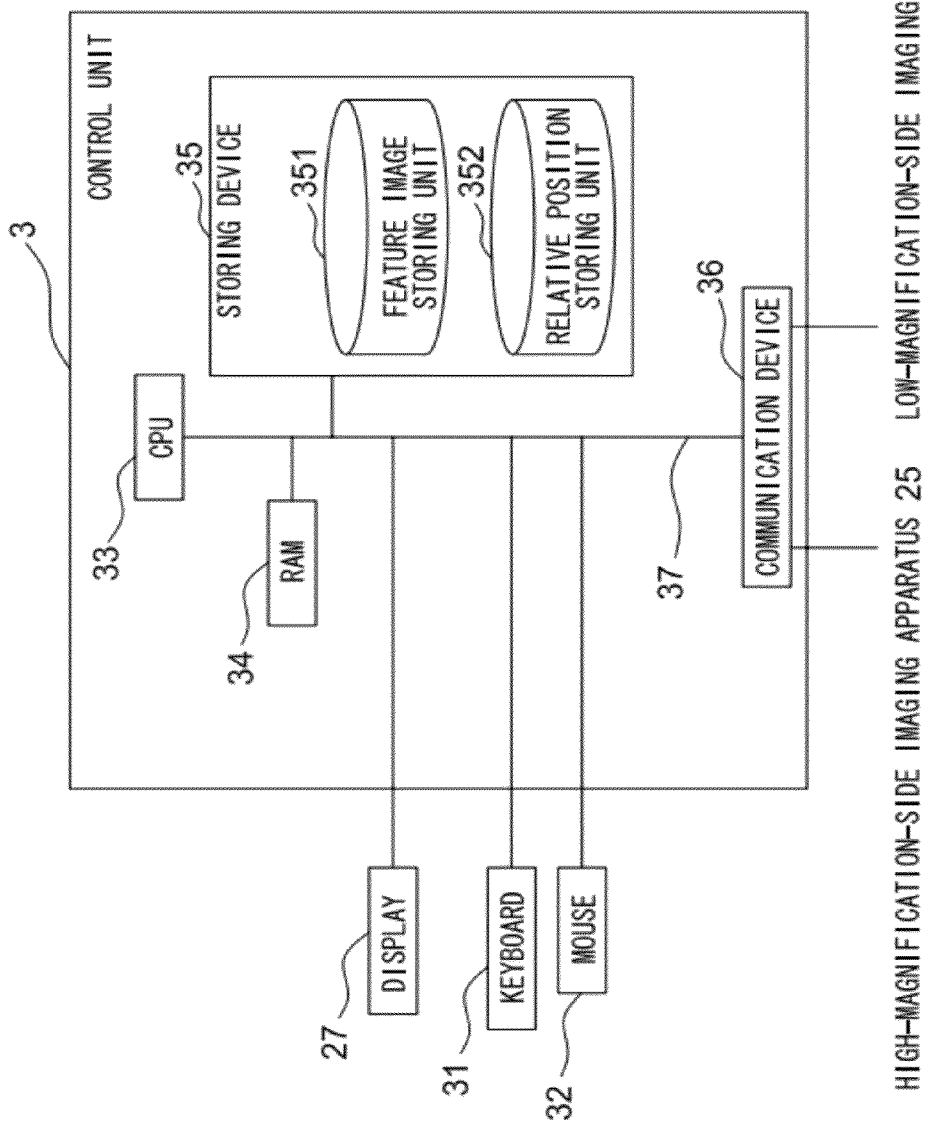
FIG. 3 is a block diagram showing a configuration of a control unit of the image measuring apparatus according to the first embodiment of the present invention.

FIG. 3 is a block diagram showing the configuration of the control unit 3 of the image measuring apparatus 1 according to the first embodiment of the present invention. As shown in FIG. 3, the control unit 3 of the image measuring apparatus 1 according to the first embodiment includes at least a CPU (central processing unit) 33, a storing device 35 such as a RAM (random access memory) 34 or a disk, a communication device 36, and an internal bus 37 that connects the hardware mentioned above. Through the internal bus 37, the control unit 3 is connected to a mouse 32 and a keyboard 31, which are input devices, and a display device 27, which is an output device.

The CPU 33 is connected through the internal bus 37 to components as described above of hardware of the control unit 3, and controls the operation of the components of hardware and executes various software functions in accordance with computer programs stored in the storing device 35. The RAM 34 is a volatile memory, such as an SRAM (static random access memory) or an SDRAM (synchronous dynamic random access memory), and a load module is expanded during execution of a computer program to store temporary data and the like generated during execution of the computer program.

Both of image data obtained by imaging using the high-magnification-side imaging apparatus 25 and the low-magnification-side imaging apparatus 26 are stored in the storing device 35 such that high-magnification image data and low-magnification image data are aligned each other. Each of the low-magnification image and the high-magnification image as used herein is obtained by causing light from the common light receiving lens 231 to branch in two directions with the beam splitter 232, passing each branching light through the high-magnification-side image formation lens 235 or the low-magnification-side image formation lens 238, and forming an image on the imaging device 251 or 261. Both the images are taken on the same axis. That is, they are taken so that the center of the field of view of the low-magnification image agrees with the center of the field of view of the high-magnification image.

The storing device 35 includes a feature image storing unit 351 and a relative position storing unit 352. The feature image storing unit 351 stores feature image data representing a feature for each measurement object 20. Matching the stored feature image data with the acquired image data makes it possible to grasp what attitude and position are taken when the measurement object 20 is mounted on the stage 21. The relative position storing unit 352 stores information on relative positions for a feature image, the information representing a measurement position the specification of which has been received and a display position of a dimension line for indicating the measurement position. Based on the stored information on relative positions, the relative positions for displaying the measurement position and the dimension line are determined upon identifying the attitude and the position of an image of the measurement object 20. Needless to say, the feature image storing unit 351 and the relative position storing unit 352 may be integrated for storing.

The communication device 36 is connected to the internal bus 37, and is connected through communication lines to high-magnification-side imaging apparatus 25 and the low-magnification-side imaging apparatus 26 to receive image data taken by the imaging apparatuses 25 and 26. By establishing connection to external networks such as the Internet, LAN (local area network) and WAN (wide area network), data can be sent and received to and from the external computers and the like. Computer programs stored in the storing device 35 are downloaded from external computers through the communication device 36.

Figure 4:
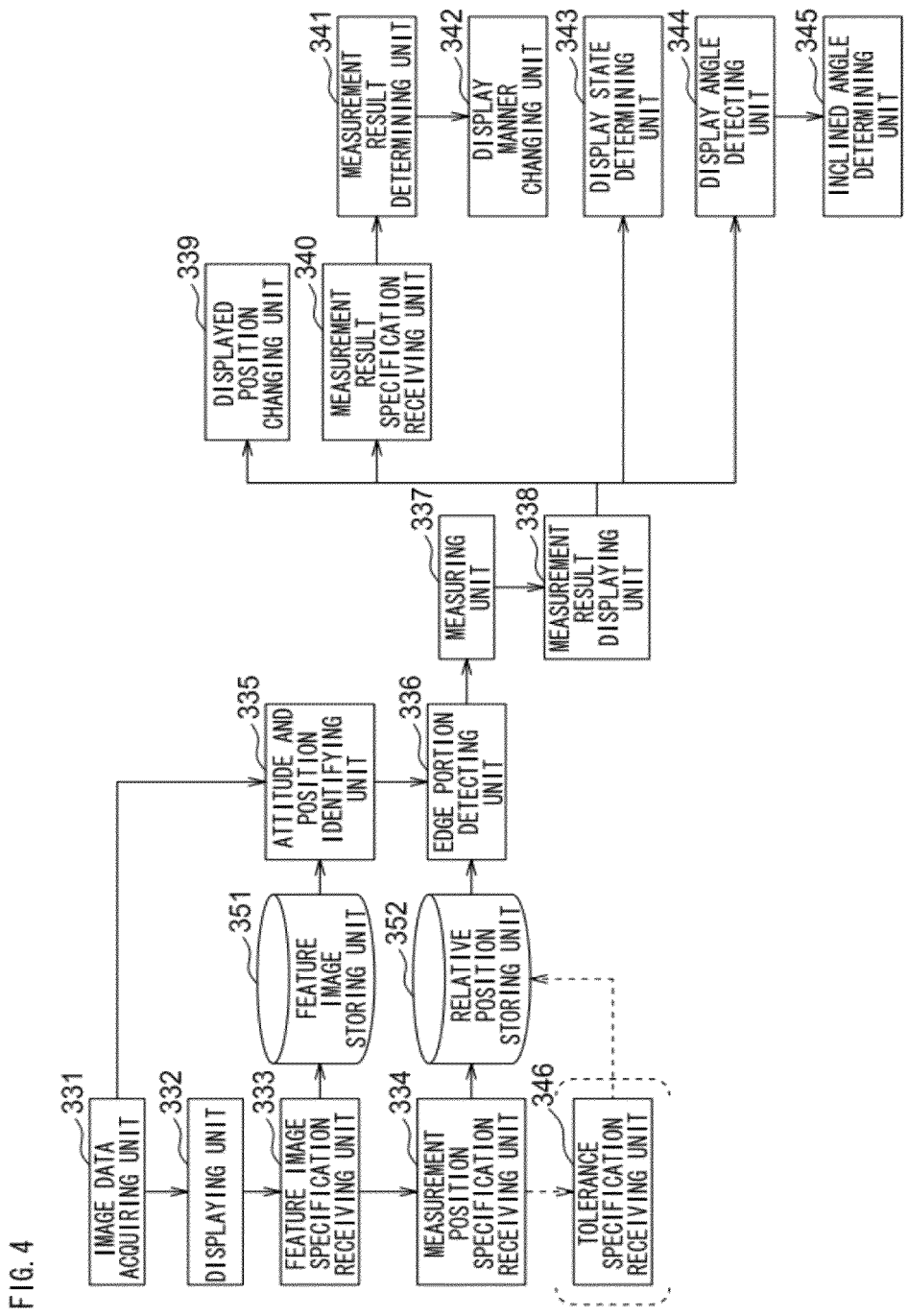
FIG. 4 is a block diagram showing functions realized by the control unit of the image measuring apparatus according to the first embodiment of the present invention.

FIG. 4 is a block diagram showing functions realized by the control unit 3 of the image measuring apparatus 1 according to the first embodiment of the present invention. In FIG. 4, an image data acquiring unit 331 acquires low-magnification image data of a low-magnification image taken by the low-magnification-side imaging apparatus 26 and high-magnification image data of a high-magnification image taken, on the same axis as that of the low-magnification image, by the high-magnification-side imaging apparatus 25. Both of the acquired image data are stored in the storing device 35.

A displaying unit 332 displays the acquired low-magnification image data or high-magnification image data on the display 27; a feature image specification receiving unit 333 receives area specification to specify a partial image considered as an image that represents a portion characteristic of the image of the measurement object 20 displayed on the display 27. The way of receiving area specification is not particularly limited. For example, specification of a rectangular area including a partial image that is considered as an image representing a characteristic portion is received by a drag operation and the like of the mouse 32 and the like. The partial image included in the rectangular area, the specification of which has been received, is stored as a feature image of the measurement object 20 in the feature image storing unit 351 of the storing device 35.

A measurement position specification receiving unit 334 receives specification of a measurement position for the image of the measurement object 20 displayed on the display 27. The way of receiving specification of a measurement position is not particularly limited. For example, area specification to specify the vicinity of an edge portion is received by a drag operation and the like of the mouse 32 and the like. Note that a tolerance specification receiving unit 346 to receive specification of an appropriate range of a tolerance may be included. The way of receiving specification of an appropriate range of a tolerance is not particularly limited. For example, specification may be received by pressing keys of the keyboard 31 from a setting window.

An attitude and position identifying unit 335 performs a matching process (compare) between the acquired image data of the measurement object 20 and the feature image stored in the feature image storing unit 351 to identify information on the attitude and the position of the image of the measurement object 20. An edge portion detecting unit 336 sets a measurement position for the image of the measurement object 20, for which the attitude and the position have been identified, based on information on the relative position of a measurement position for the feature image stored in the relative position storing unit 352, and detects an edge portion at the set measurement position. The measuring unit 337 measures predetermined physical quantities based on the detected edge portion and the identified information on the attitude and the position of the image of the measurement object 20.

A measurement result displaying unit 338 displays a measurement result and a dimension line indicating a measurement position at predetermined positions, based on information on the relative positions for the feature image stored in the relative position storing unit 352, the information representing the measurement position and a display position of the dimension line. Note that information on a relative position for displaying a measurement result for an image of the measurement object 20 is also stored in the relative position storing unit 352, and the measurement result may be displayed at a predetermined position based on the attitude and the position of an image of the measurement object 20 identified in the attitude and position identifying unit 335 and the information on the relative position for displaying the measurement result for the image of the measurement object 20. This allows the display position of the measurement result to be changed in accordance with the attitude and the position of the image of the measurement object 20.

A display position changing unit 339 receives a change in position at which a dimension line and/or a measurement result are displayed. The way of receiving a change in position for displaying is not particularly limited. For example, it is received by a drag operation and the like of the mouse 32 and the like.

A measurement result specification receiving unit 340 receives specification of a measurement result to be an object of determination of whether the measurement result is within a predetermined tolerance. The way of receiving specification of a measurement result is not particularly limited. For example, specification of a display position of a measurement result may be received, and specification of a measurement position for measuring a measurement result may also be received, by a click operation and the like of the mouse 32 and the like.

A measurement result determining unit 341 determines whether the measurement result, the specification of which has been received, is within a predetermined tolerance. A display manner changing unit 342 changes the display manner of the measurement result, the specification of which has been received in the measurement result specification receiving unit 340, and the measurement result that is determined in the measurement result determining unit 341 to be within the tolerance. For example, changing the display manner, such as changing the display color and highlighting, allows a user to visually confirm the measurement result that is determined to be within the tolerance.

A display state determining unit 343 determines whether a portion displayed outside a display range exists in a measurement result. If it is determined in the display state determining unit 343 that the portion displayed outside the display range exists in the measurement result, the measurement result displaying unit 338 moves the display position of the measurement result into the display range so that the measurement result is displayed within the display range. Accordingly, a user can visually confirm the measurement result.

A display angle detecting unit 344 detects an inclined angle of a display position of a measurement result; an inclined angle determining unit 345 determines whether the inclined angle detected in the display angle detecting unit 344 is equal to or greater than a predetermined angle. If it is determined in the inclined angle determining unit 345 that the inclined angle is equal to or greater than the predetermined angle, the measurement result displaying unit 338 displays the measurement result in an upside-down manner.

Figure 5:
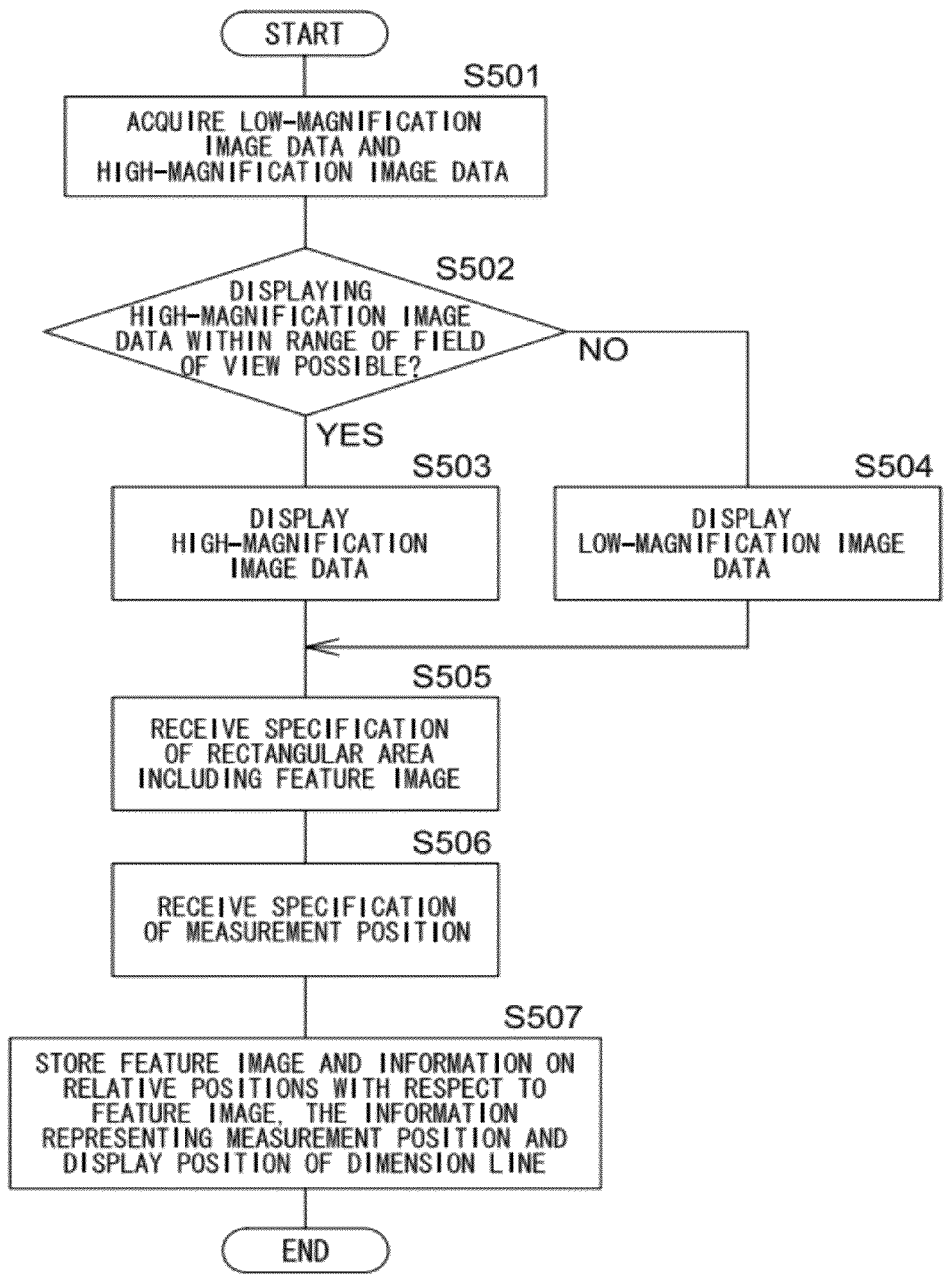
FIG. 5 is a flow chart showing a procedure of a feature image storing process of a CPU of the control unit of the image measuring apparatus according to the first embodiment of the present invention.

FIG. 5 is a flow chart showing the procedure of a feature image storing process of the CPU 33 of the control unit 3 of the image measuring apparatus 1 according to the first embodiment of the present invention. The CPU 33 of the control unit 3 acquires low-magnification image data of a low-magnification image taken by the low-magnification-side imaging apparatus 26 and high-magnification image data of a high-magnification image taken, on the same axis as that of the low-magnification image, by the high-magnification-side imaging apparatus 25 (step S501). Both of the acquired image data are stored in the storing device 35.

The CPU 33 determines whether displaying the high-magnification image data within the range of the field of view is possible (step S502). If it is determined by the CPU 33 that displaying the high-magnification image data within the range of the field of view is possible (step S502: YES), then the CPU 33 displays the high-magnification image data on the display 27 (step S503); if it is determined by the CPU 33 that displaying the high-magnification image data within the range of the field of view is impossible (step S502: NO), the CPU 33 displays the low-magnification image data on the display 27 (step S504).

FIGS. 6A to 6C are schematic views showing a relationship between an image of the measurement object 20 and the range of the field of view and a relationship between the measurement object 20 and the display position of the measurement result. When an image (image data) of the measurement object 20 is acquired as shown in FIG. 6A, it is not clear what portion of the measurement object 20 is displayed in the case where a range 61 of the field of view is too small for image data of the measurement object 20 as shown in FIG. 6B, such as the case of displaying high-magnification image data. In contrast, the entire image of the measurement object 20 is within the range 61 of the field of view as shown in FIG. 6C in the case where the range 61 of the field of view is sufficiently large for the image data of the measurement object 20, such as the case of displaying low-magnification image data.

As shown in FIG. 6C, specification of a measurement area 62 of the measurement object 20 whose entire image is displayed within the range 61 of the field of view is received by a drag operation and the like of the mouse 32 and the like. This enables a user to specify the measurement area 62 while viewing the entire image of the measurement object 20. Accordingly, a user can specify the measurement area while visually confirming what portion is being measured. It is therefore possible to prevent a wrong portion from being measured.

Referring back to FIG. 5, the CPU 33 of the control unit 3 receives specification of a rectangular area including a feature image considered as an image representing a characteristic portion on a low-magnification image or a high-magnification image (step S505). The way of receiving specification of a rectangular area including a feature image is not particularly limited. For example, specification of a display position of a measurement result may be received by a drag operation and the like of the mouse 32 and the like, and a partial image included in the rectangular area, the specification of which has been received, may be stored as a feature image of the measurement object 20 in the feature image storing unit 351 of the storing device 35.

The CPU 33 receives specification of a measurement position on the displayed low-magnification image or high-magnification image (step S506). The way of receiving specification of the measurement position is not particularly limited. For example, area specification of the vicinity of the edge portion is received by a drag operation and the like of the mouse 32 and the like. Note that specification of an appropriate range of a tolerance may be received in step S506. The way of receiving specification of an appropriate range of a tolerance is not particularly limited. For example, specification may be received by pressing keys of the keyboard 31 from a setting window. The following may be mentioned as another example. With the measurement result displayed, specification of a measurement position is received by a click operation and the like of the mouse 32 and the like. Then, specification of an appropriate range of a tolerance is received for each measurement position the specification of which has been received.

The CPU 33 stores the feature image, the specification of which has been received, in the feature image storing unit 351; the CPU 33 stores information on relative positions for the feature image, which represents the measurement position the specification of which has been received and the display position of the dimension line indicating the measurement position, in the relative position storing unit 352 (step S507).

Figure 7A:
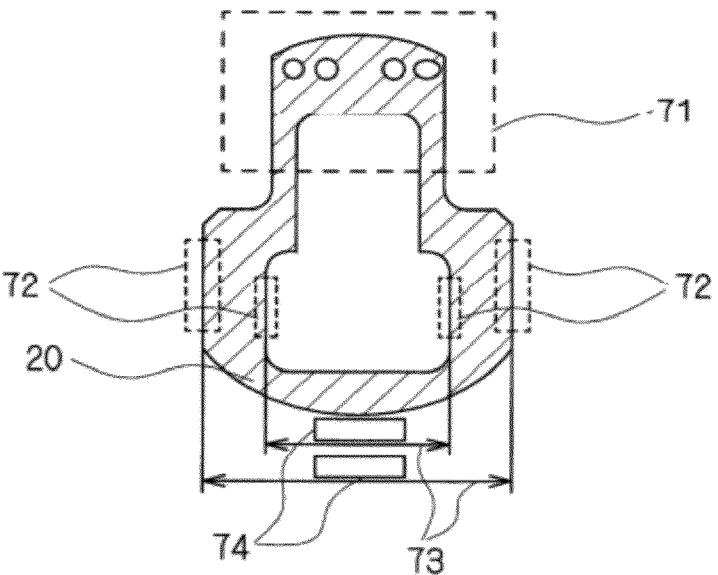
FIGS. 7A to 7C are schematic views showing a way of receiving specification of a feature image and measurement positions.
Figure 7B:
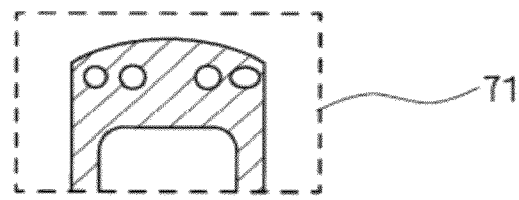
Figure 7C:
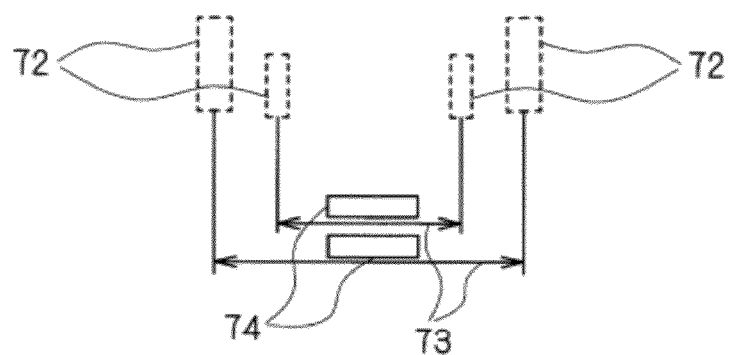

FIGS. 7A to 7C are schematic views showing the way of receiving specification of a feature image and measurement positions. FIG. 7A shows an example of the way of receiving specification of a rectangular area 71 including a feature image and measurement positions 72. FIG. 7B shows an example of a feature image the specification of which is received and stored in the feature image storing unit 351. FIG. 7C shows an example of information on relative positions of the measurement positions 72, the specification of which is received, and display positions of dimension lines 73 and measurement results 74, the specification of which is received and stored in the relative position storing unit 352.

Initially, receiving specification of the rectangular area 71 as shown in FIG. 7A allows a feature image as shown in FIG. 7B to be cut out and stored in the feature image storing unit 351. Not only image data of the feature image but also coordinates, a rotation angle and the like at a relative position of the rectangular area 71 for an image of the measurement object 20 are stored in the feature image storing unit 351.

Next, receiving specification of the measurement positions 72 as shown in FIG. 7A allows information on relative positions for the feature image, which represents the measurement positions and the display positions of the dimension lines 73 indicating the measurement positions, to be stored in the relative position storing unit 352 as shown in FIG. 7C. Not only the information on relative positions but also coordinates, rotation angles and the like at the relative positions for the image of the measurement object 20, which represent the measurement positions 72 and the display positions of the dimension lines 73, are stored in the relative position storing unit 352. Note that measurement result display positions 74 at which displaying measurement results are displayed may be stored in the relative position storing unit 352 in the same way as those of other elements, as shown in FIG. 7C.

Figure 8:
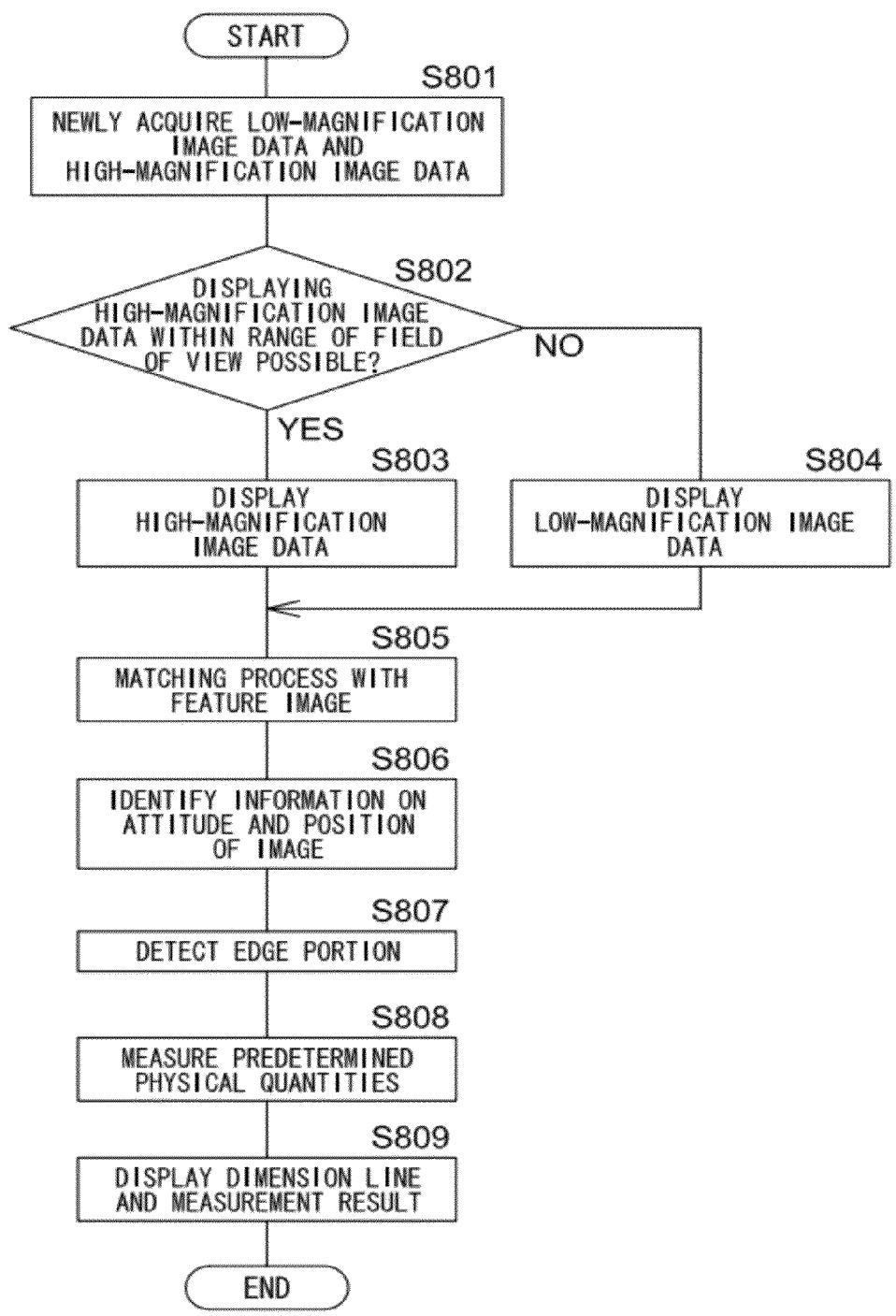
FIG. 8 is a flow chart showing a procedure of an image measuring process of the CPU of the control unit of the image measuring apparatus according to the first embodiment of the present invention.

FIG. 8 is a flow chart showing the procedure of an image measuring process of the CPU 33 of the control unit 3 of the image measuring apparatus 1 according to the first embodiment of the present invention. The CPU 33 of the control unit 3 newly acquires low-magnification image data of a low-magnification image taken by the low-magnification-side imaging apparatus 26 and high-magnification image data of a high-magnification image taken, on the same axis as that of the low-magnification image, by the high-magnification-side imaging apparatus 25 (step S801). Both of the acquired image data are stored in the storing device 35.

The CPU 33 determines whether displaying the high-magnification image data within the range of the field of view is possible (step S802). If it is determined by the CPU 33 that displaying the high-magnification image data within the range of the field of view is possible (step S802: YES), then the CPU 33 displays the high-magnification image data on the display 27 (step S803); if it is determined by the CPU 33 that displaying the high-magnification image data within the range of the field of view is impossible (step S802: NO), the CPU 33 displays the low-magnification image data on the display 27 (step S804).

The CPU 33 performs a matching process (compare) between the newly acquired image data and the feature image stored in the feature image storing unit 351 (step S805) to identify information on the attitude and the position of an image of the measurement object 20 (step S806). The CPU 33 sets a measurement position for the image of the measurement object 20, for which the attitude and the position have been identified, based on the information on the relative position of a measurement position for the feature image stored in the relative position storing unit 352, and detects an edge portion of the set measurement position (step S807).

FIGS. 9A and 9B show an example of a matching process between a feature image and an image of the measurement object 20. FIG. 9A shows an example of a newly acquired image data, and FIG. 9B shows an example of a feature image stored in the feature image storing unit 351.

When an image data of the measurement object 20 is newly acquired as shown in FIG. 9A, the acquired image data is searched for a partial image that agrees with a feature image 91 shown in FIG. 9B. If the partial image that agrees with the feature image 91 is found, the rectangular area 71 for this partial image is identified. Coordinates, a relative rotation angle and the like of a relative position of the rectangular area 71 for an image of the measurement object 20 are stored in the feature image storing unit 351 and coordinates, relative rotation angles and the like of relative positions for the image of the measurement object 20, which represent the measurement positions 72 and display positions of the dimension lines 73, are stored in the relative position storing unit 352. Therefore, specifying the rectangular area 71 allows accurate specification of what portion of the measurement object 20 is a measurement position. A desired edge portion can thus be detected.

Referring back to FIG. 8, the CPU 33 of the control unit 3 measures predetermined physical quantities based on the detected edge portion (step S808). The predetermined physical quantities to be measured include a length, a diameter, an angle and the like. The CPU 33 displays a dimension line indicating a measurement position and a measurement result at predetermined positions based on the information on the relative position for the feature image, which represents a display position of the dimension line, stored in the relative position storing unit 352 (step S809).

FIGS. 10A to 10C are schematic views showing the way of displaying measurement positions and dimension lines. As shown in FIG. 10A, predetermined physical quantities, such as a length, a diameter and an angle, measured for the measurement positions 62 are displayed as measurement results 64 at predetermined positions, based on the identified attitude and position of an image of the measurement object 20 and information on relative positions for displaying dimension lines 63 for a feature image stored in the relative position storing unit 352.

Note that the measurement positions 62 and display positions of the dimension lines 63 are stored as relative positions for a feature image. Therefore, for example, even when the measurement object 20 is mounted at a given position on the stage 21 as shown in FIG. 10B, the measurement positions 62 and display positions of the dimension lines 63 are moved and rotated correspondingly to the identified attitude and the position of the measurement object 20, allowing the measurement results 64 to be displayed at positions at which the measurement results are easily visible, as shown in FIG. 10C. Accordingly, even if a user arbitrarily mounts measurement object 20 on the stage 21, the measurement positions 62 and the dimension lines 63 can be moved and rotated correspondingly to the attitude and the position of the measurement object 20, and thus be displayed. The measurement results 64 measured at the stored measurement positions 62 can thus be displayed at positions at which they are easily visible.

Information on relative positions for displaying the measurement results 64 for the feature image may be stored in the relative position storing unit 352, and the CPU 33 of the control unit 3 may display the measurement results 64 at predetermined positions, based on the identified attitude and the position of the image of the measurement object 20 and information on relative positions for displaying the measurement results 64 for the feature image. This allows display positions of the measurement results 64 to be changed in accordance with the attitude and the position of the image of the measurement object 20.

When the display position of the dimension line 63 and the measurement result 64 are automatically identified in this way, the measurement result 64 might protrude outside the display range depending on how the measurement object 20 is mounted. If the measurement result 64 protrudes outside the display range, a user cannot be aware of the measurement result 64 and cannot visually confirm it.

To overcome this drawback, in the first embodiment, the dimension line 63 and/or the measurement result 64 are moved and displayed so that they are within the display range by receiving changes of positions for displaying the dimension line 63 and/or the measurement result 64. This enables a user to visually confirm them. Of course, the following way may be used. The CPU 33 determines whether a portion displayed outside the display range exists in the measurement result 64. If it is determined that a portion displayed outside the display range exists, then the CPU 33 may move the display position of the measurement result 64 to be within the display range. FIGS. 11A and 11B are schematic views for illustrating the way of changing display positions of the dimension line 63 and/or the measurement result 64 if the measurement result 64 protrudes outside the display range.

If the measurement object 20 is mounted to be positioned at an upper position of the display screen as shown in FIG. 11A, the dimension line 63 indicating the length of an upper side of the measurement object 20 and the measurement result 64 are displayed in an area 81 outside the range 61 of the field of view. A user cannot visually confirm them. To overcome this drawback, the CPU 33 determines whether the area 81 for displaying dimension line 63 and the measurement result 64 outside the range 61 of the field of view exist. If the existence is determined, then the display position is changed by decreasing the height of the dimension line 63 so that the measurement result 64 is within the range 61 of the field of view as shown in FIG. 11B. Of course, a user may explicitly move the display position by a drag operation and the like of the mouse 32 and the like.

Depending on how the measurement object 20 is mounted on the stage 21, a case may occur where the measurement result 64 is displayed in an upside-down manner to cause a measured value displayed as the measurement result 64 to be illegible. To overcome this drawback, in the first embodiment, the inclined angle of a display position of the measurement results 64 is detected, and the measurement result 64 is displayed in an upside-down manner if the detected inclined angle is equal to or greater than a predetermined angle. This enables the measurement result 64 to be displayed as a measured value that can always be easily confirmed by a user.

FIGS. 12A to 12D are schematic views for illustrating ways of changing a display position when the measurement result 64 is displayed in an upside-down manner.

Figure 12A:
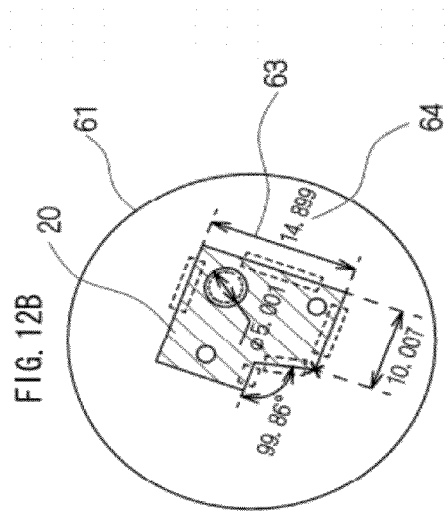
FIGS. 12A to 12D are schematic views for illustrating the ways of changing a display position when measurement results are displayed in an upside-down manner.
Figure 12B:
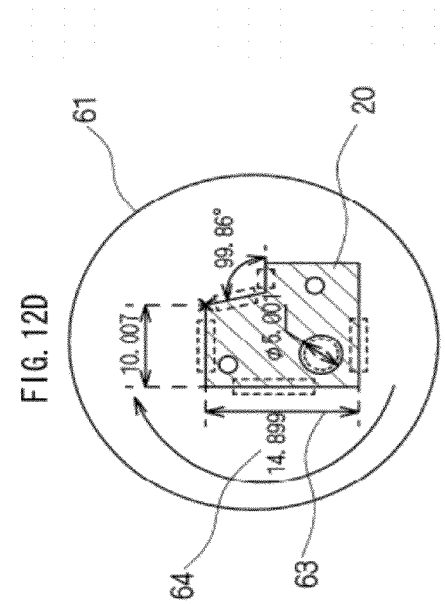

As shown in FIG. 12A, for example, when an image of the measurement object 20 rotates clockwise or counterclockwise by 90 degrees or more with respect to the stored feature image of the measurement object 20, the numerical values of the measurement results 64 are displayed in an upside-down manner. This is a display manner that makes it difficult for a user to confirm the measurement results. To overcome this drawback, if the CPU 33 determines that the image of the measurement object 20 rotates clockwise or counterclockwise by 90 degrees or more, the measurement results 64 are displayed in an upside-down manner as shown in FIG. 12B. Accordingly, a user can easily confirm the measurement results 64 visually.

Figure 12C:
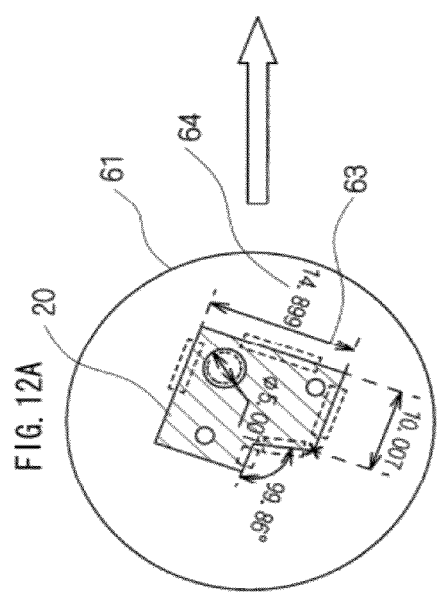

The way to overcome the drawback is, of course, not limited to displaying the measurement results 64 in an upside-down manner. Any display manner may be employed as long as it allows the measurement results 64 to be displayed such that a user can easily confirm the measurement results. For example, as shown in FIG. 12C, the measurement results 64 may be displayed in alignment in the transverse direction of a screen, not displayed in an upside-down manner.

Figure 12D:
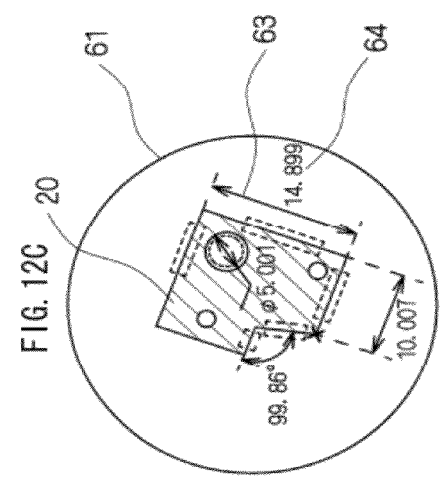

Further, the image itself of the measurement object 20 may be rotated to display the measurement results 64. That is, as shown in FIG. 12D, the relative position relationship is stored such that the image of the measurement object 20 is integrated with the dimension lines 63 and the measurement results 64. If the CPU 33 determines that the image of the measurement object 20 rotates clockwise or counterclockwise by 90 degrees or more with respect to the stored feature image of the measurement object 20, the image, the dimension lines 63 and the measurement results 64 of the measurement object 20 are integrally rotated until the image is in the same direction as that of the stored feature image. In this manner, the measurement results 64 can be displayed in such a display manner that the measurement results 64 are more easily confirmed.

In addition, regarding the measurement results 64 for which the CPU 33 determines whether the measurement results 64 are within the range of a tolerance and the CPU 33 determines that they are within the range of the tolerance, the display manner of the measurement results 64 may be changed. For example, changing the display manner, such as changing the display color and highlighting, permits a user to visually confirm the measurement results 64 that has not been within the range of the tolerance. Note that for the measurement results 64 to be objects of determination of whether the measurement results 64 are within the range of the tolerance, it is to be understood that the display manner of the measurement results 64 may be changed.

As described above, according to the first embodiment, a feature image the specification of which has been received and information on relative positions for the feature image, the information representing a measurement position and a display position of a dimension line indicating the measurement position, are stored. This allows a matching process between an image of the measurement object 20 and the feature image to be performed to determine the attitude and the position of the image of the measurement object 20 and relative positions for the image of the measurement object 20 that represent the measurement positions 62 and display positions of the dimension lines 63 indicating the measurement positions 62. Accordingly, a user can visually confirm what portions of the measurement object 20 correspond to the measurement results 64 without depending on the attitude, the position and the like of the image of the measurement object 20.

Second Embodiment

The configuration of the image measuring apparatus 1 according to a second embodiment of the present invention is the same as that of the first embodiment, and therefore the components are denoted by the same reference numerals and the detailed description thereof will not be given. The second embodiment differs from the first embodiment in that information on display positions of dimension lines indicating the displayed measurement positions and measurement results is stored in association with the attitude and the position of an image of the measurement object 20, and the image of the measurement object 20 is displayed in accordance with the displayed dimension lines, the measurement results and measurement positions functioning as the basis of measurement.

Figure 13:
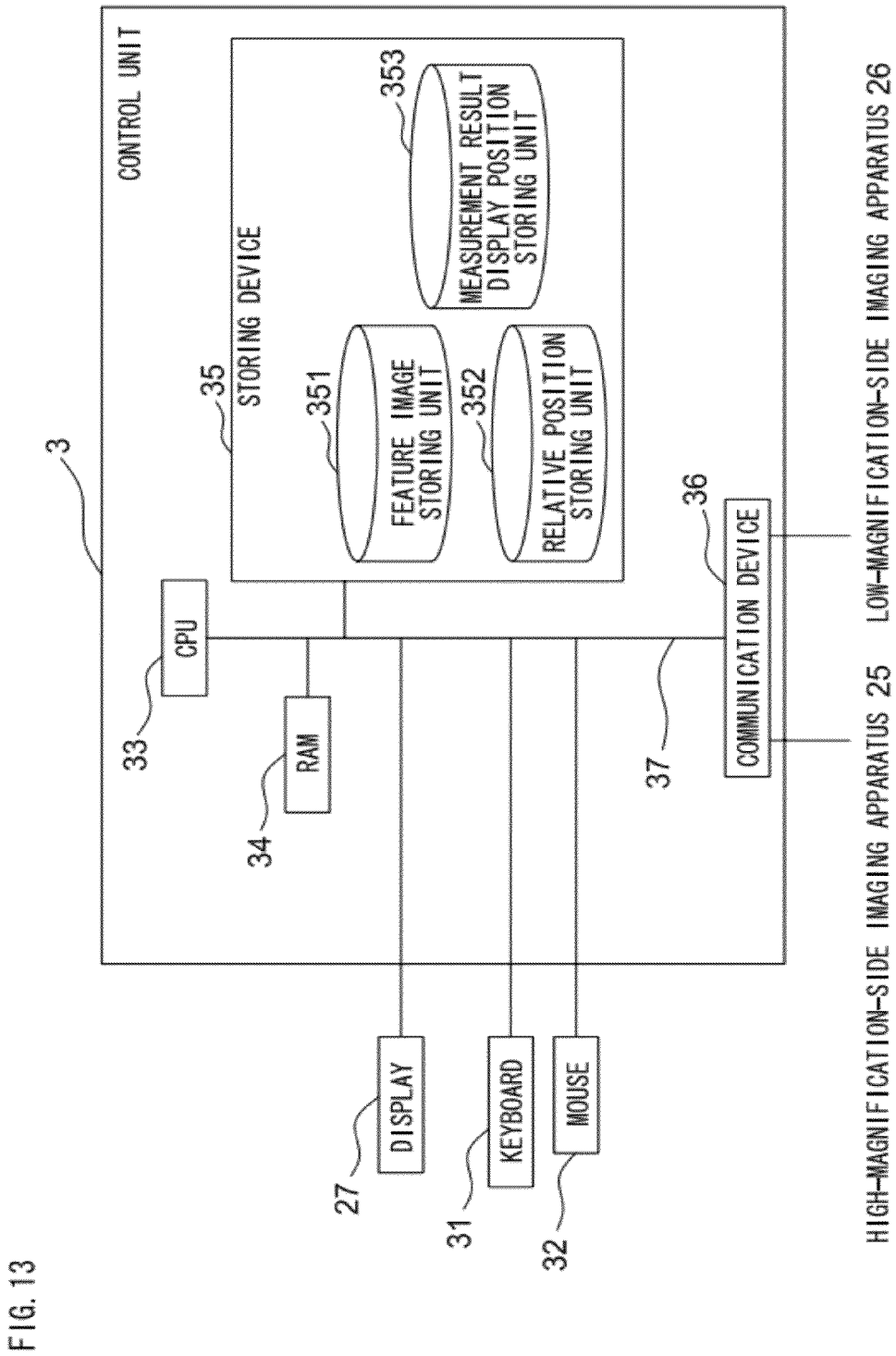
FIG. 13 is a block diagram showing a configuration of a control unit of an image measuring apparatus according to a second embodiment of the present invention.

FIG. 13 is a block diagram showing the configuration of the control unit 3 of the image measuring apparatus 1 according to the second embodiment of the present invention. The hardware configuration of the control unit 3 of the image measuring apparatus 1 according to the second embodiment is the same as that of the first embodiment, as shown in FIG. 13, and therefore the same components are denoted by the same reference numerals and the detailed description thereof will not be given.

The storing device 35 includes a measurement result display position storing unit 353 in addition to the feature image storing unit 351 and the relative position storing unit 352. The measurement result display position storing unit 353 stores information on relative positions for an image of the measurement object 20, the information representing the attitude, the position, the measurement positions and display positions of dimension lines of the image of the measurement object 20. Based on the stored information on relative positions, the relative positions for displaying the corresponding measurement positions and the dimension lines are determined upon identifying information on the attitude and the position of the image of the measurement object 20. Needless to say, information on the relative position may be stored for the positions for displaying measurement results.

Figure 14:
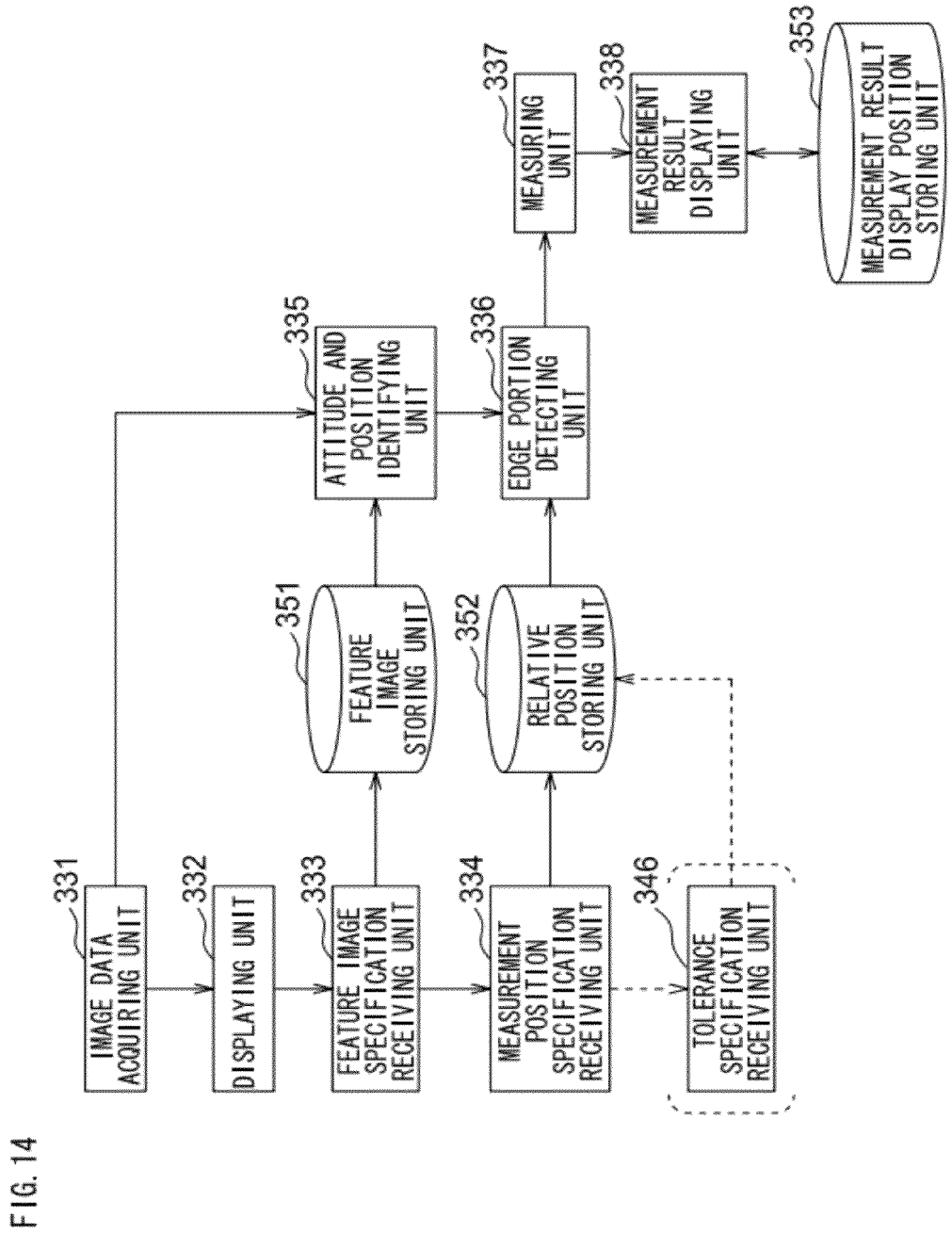
FIG. 14 is a function block diagram showing functions realized by a control unit of the image measuring apparatus according to the second embodiment of the present invention.

FIG. 14 is a function block diagram showing functions realized by the control unit 3 of the image measuring apparatus 1 according to the second embodiment of the present invention. In FIG. 14, the image data acquiring unit 331 acquires low-magnification image data of a low-magnification image taken by the low-magnification-side imaging apparatus 26 and high-magnification image data of a high-magnification image taken, on the same axis as that of the low-magnification image, by the high-magnification-side imaging apparatus 25. Both of the acquired image data are stored in the feature image storing unit 351 of the storing device 35.

The displaying unit 332 displays the acquired low-magnification image data or high-magnification image data on the display 27; the feature image specification receiving unit 333 receives area specification to specify a partial image considered as an image that represents a portion characteristic of an image of the measurement object 20 displayed on the display 27. The way of receiving area specification is not particularly limited. For example, specification of a rectangular area including a partial image that is considered as an image representing a characteristic portion is received by a drag operation and the like of the mouse 32 and the like. The partial image included in the rectangular area, the specification of which has been received, is stored as a feature image of the measurement object 20 in the feature image storing unit 351 of the storing device 35.

The measurement position specification receiving unit 334 receives specification of a measurement position for the image of the measurement object 20 displayed on the display 27. The way of receiving specification of a measurement position is not particularly limited. For example, area specification to specify the vicinity of an edge portion is received by a drag operation and the like of the mouse 32 and the like. Note that the tolerance specification receiving unit 346 to receive specification of an appropriate range of a tolerance may be included. The way of receiving specification of an appropriate range of a tolerance is not particularly limited. For example, specification may be received by pressing keys of the keyboard 31 from a setting window.

The attitude and position identifying unit 335 performs a matching process (compare) between the acquired image data of the measurement object 20 and the feature image stored in the feature image storing unit 351 to identify information on the attitude and the position of the image of the measurement object 20. The edge portion detecting unit 336 sets a measurement position for the image of the measurement object 20, for which the attitude and the position have been identified, based on information on the relative position of a measurement position for the feature image stored in the relative position storing unit 352, and detects an edge portion of the set measurement position; the measuring unit 337 measures predetermined physical quantities based on the detected edge portion and the identified information on the attitude and the position of the image of the measurement object 20.

The measurement result displaying unit 338 displays a measurement result and a dimension line indicating a measurement position at predetermined positions, based on the information on the relative positions for the feature image stored in the relative position storing unit 352, the information representing the measurement position and a display position of the dimension line. Information on relative positions for the measurement object 20 that represents display positions of a dimension line and a measurement result are stored in the measurement result display position storing unit 353 in association with the feature image of the measurement object 20 being displayed.

Figure 15:
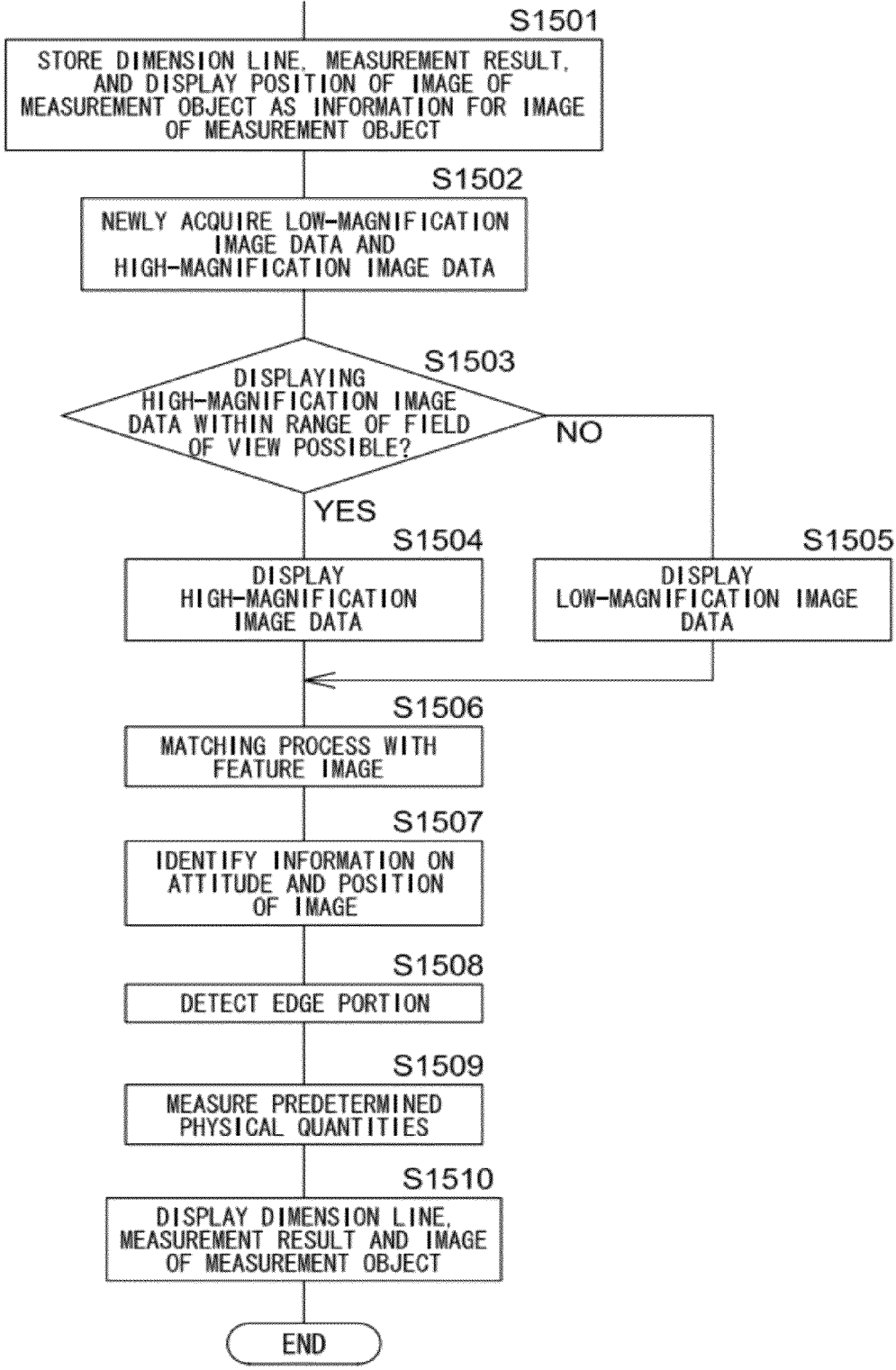
FIG. 15 is a flow chart showing a procedure of an image measuring process of a CPU of the control unit of the image measuring apparatus according to the second embodiment of the present invention.

FIG. 15 is a flow chart showing the procedure of an image measuring process of the CPU 33 of the control unit 3 of the image measuring apparatus 1 according to the second embodiment of the present invention. The CPU 33 of the control unit 3 displays a dimension line indicating a measurement position and a measurement result at predetermined positions based on the information on the relative position for the feature image, which represents a display position of the dimension line, stored in the relative position storing unit 352 (step S809 in FIG. 8), and stores in the measurement result display position storing unit 353 the displayed dimension line, measurement result, and display position of the image of the measurement object 20 as information on relative positions for the image of the measurement object 20, the information representing the measurement position and the display position of the dimension line (step S1501).

The CPU 33 newly acquires low-magnification image data of a low-magnification image taken by the low-magnification-side imaging apparatus 26 and high-magnification image data of a high-magnification image taken, on the same axis as that of the low-magnification image, by the high-magnification-side imaging apparatus 25 (step S1502). Both of the acquired image data are stored in the feature image storing unit 351 of the storing device 35.

The CPU 33 determines whether displaying the high-magnification image data within the range of the field of view is possible (step S1503). If it is determined by the CPU 33 that displaying the high-magnification image data within the range of the field of view is possible (step S1503: YES), then the CPU 33 displays the high-magnification image data on the display 27 (step S1504); if it is determined by the CPU 33 that displaying the high-magnification image data within the range of the field of view is impossible (step S1503: NO), the CPU 33 displays the low-magnification image data on the display 27 (step S1505).

The CPU 33 performs a matching process (compare) between the newly acquired image data and the feature image stored in the feature image storing unit 351 (step S1506) to identify information on the attitude and the position of an image of the measurement object 20 (step S1507). The CPU 33 sets a measurement position for the image of the measurement object 20, for which the attitude and the position have been identified, based on the information on the relative position of a measurement position for the feature image stored in the relative position storing unit 352, and detects an edge portion of the set measurement position (step S1508).

The CPU 33 measures predetermined physical quantities based on the detected edge portion (step S1509). The predetermined physical quantities to be measured include a length, a diameter, an angle and the like. The CPU 33 displays a dimension line indicating a measurement position, a measurement result and the image of the measurement object 20 at predetermined positions based on the information on relative positions for the image of the measurement object 20, the information representing measurement position and a display position of the dimension line, stored in the measurement result display position storing unit 353 (step S1510).

Figure 16:
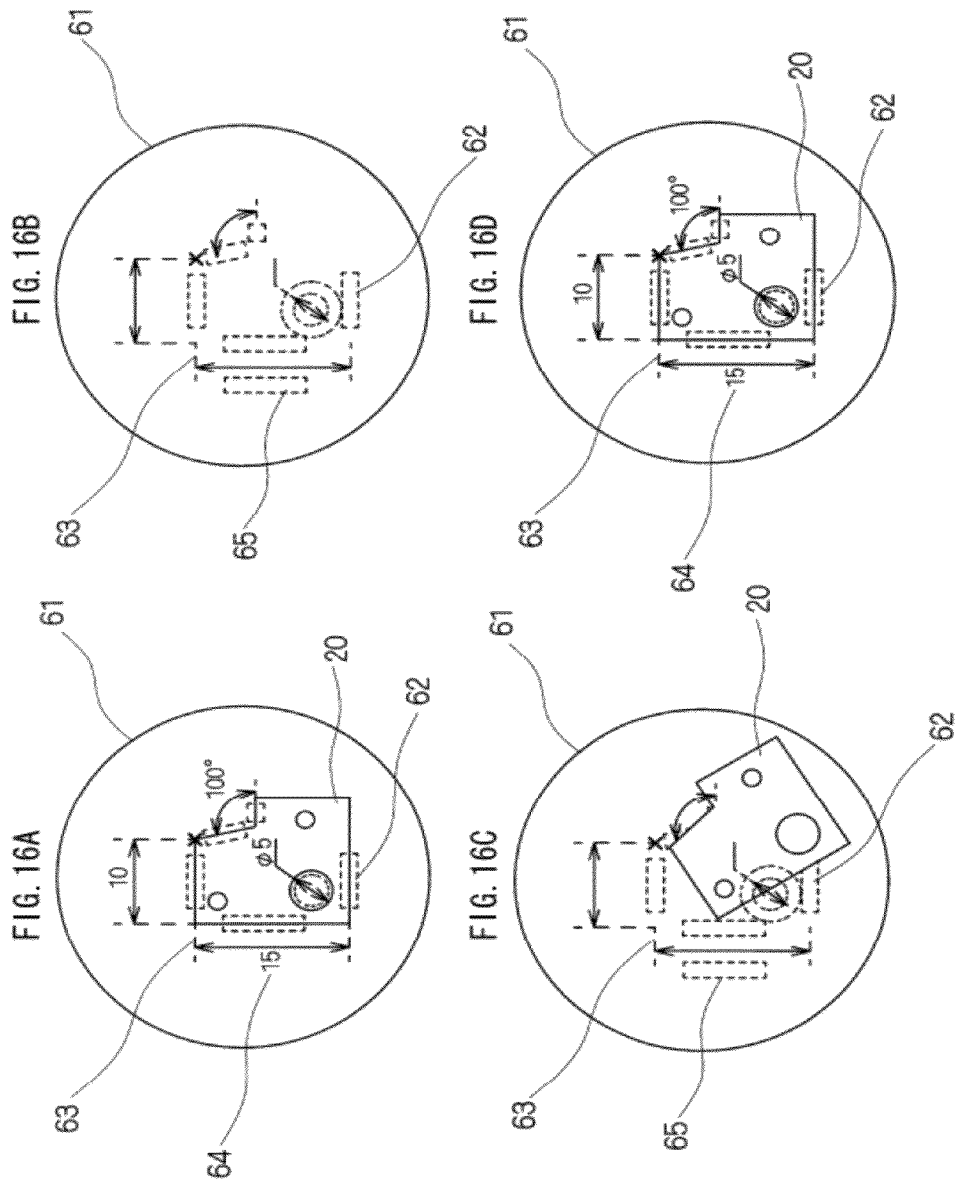
FIGS. 16A to 16D are schematic views showing the way of displaying dimension lines and measurement results.
Figure 17:
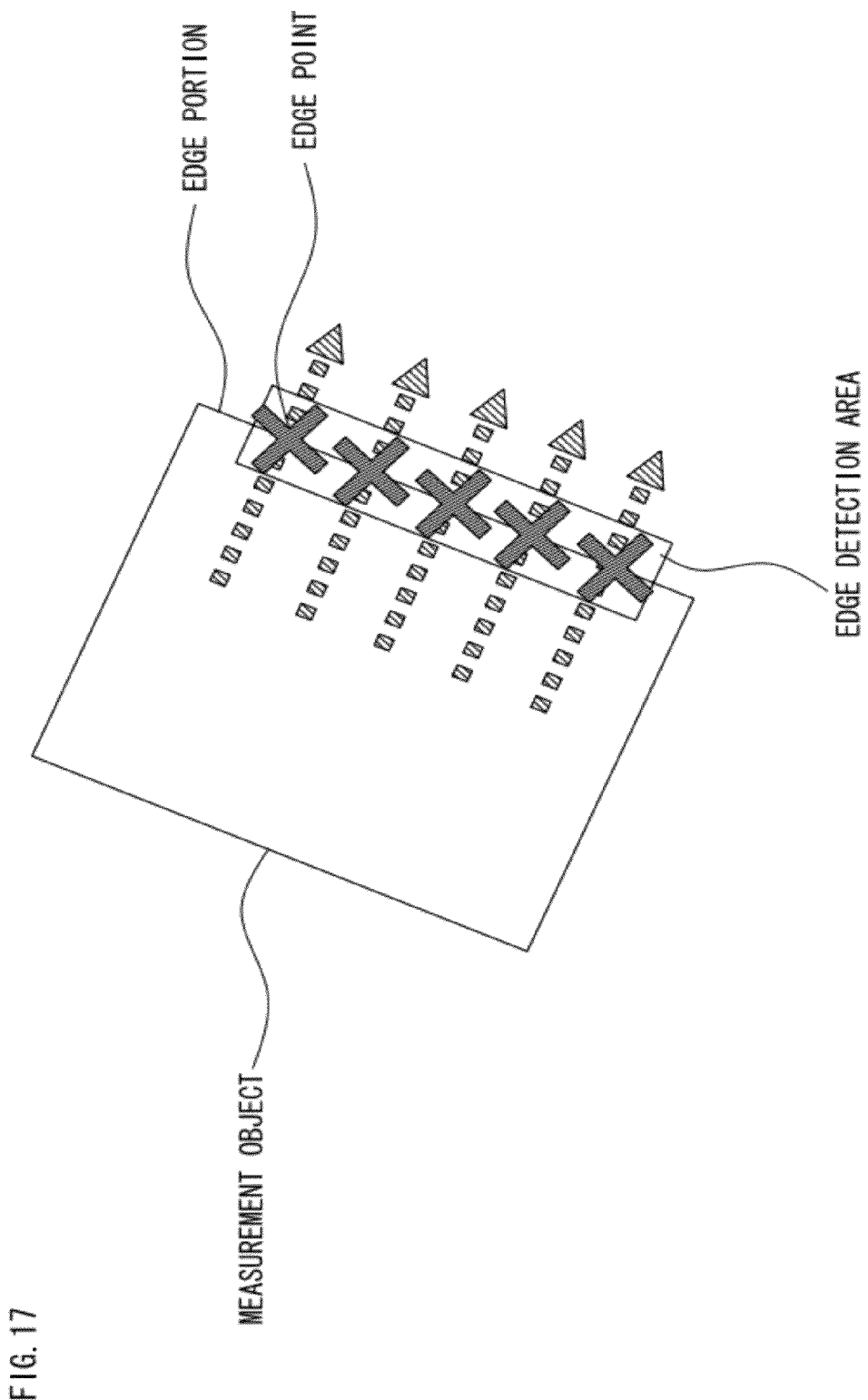
FIG. 17 shows an example of a conventional edge detection area specified on an image.
Figure 18:
FIG. 18 shows an example of a shape identified by using a method of least squares based on conventional edge points.
Figure 19:
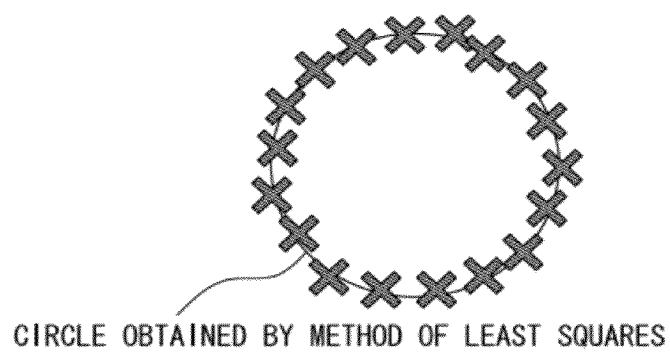
FIG. 19 is a schematic view for illustrating a circle obtained by fitting conventional edge points to a geometrical figure.

FIGS. 16A to 16D are schematic views showing the way of displaying dimension lines and measurement results. As shown in FIG. 16A, predetermined physical quantities measured, such as a length, a diameter and an angle, are displayed as measurement results 64 at predetermined positions, based on the attitude and position of the image of the measurement object 20 and information on relative positions for displaying the measurement positions (measurement areas) 62 and dimension lines 63 for the image of the measurement object 20 stored in the relative position storing unit 352.

Next, the displayed dimension lines 63, measurement positions 62, and preferably display positions 65 of the measurement results 64 are stored as relative positions with the image of the measurement object 20. For example, as shown in FIG. 16B, the measurement object 20 is removed from FIG. 16A, and the resultant is stored as a screen image excluding the display of the measurement results 64 in the measurement result display position storing unit 353.

Then, as shown in FIG. 16C, when the measurement object 20 is mounted at a given position on the stage 21, the attitude and the position of the measurement object 20 are identified, and the image itself of the measurement object 20 is moved and rotated in accordance with the corresponding feature image, and the dimension lines 63, the measurement positions 62, and preferably display positions 65 of the measurement results 64 that correspond to the feature image. That is, as shown in FIG. 16D, the image of measurement object 20 is moved and rotated so that the image of the measurement object 20 overlaps the feature image. An edge portion is automatically detected at the stored measurement positions 62 to cause predetermined physical quantities to be automatically measured, and they are displayed as the measurement results 64 at the display positions 65.

As described above, according to the second embodiment, even if the measurement object 20 is mounted at any angle on the stage 21, an image of the measurement object 20 is rotated based on the information on relative positions for the image of the measurement object 20, the information representing measurement positions and display positions of dimension line, stored in the measurement result display position storing unit 353, and the measured measurement results can be displayed at the predetermined positions. For the same measurement object 20, necessary physical quantities can be automatically measured without newly receiving specification of a measurement position.

It should be understood that the present invention is not limited to the first and second embodiments described above, and various modifications, replacements and the like may be made within the scope of the spirit of the present invention. For example, the image measuring apparatus 1 includes the main body 2 and an external computer, and image data acquired by imaging in the main body 2 may be computed by the external computer to measure dimensions and the like of a desired shape. Further, it is to be understood the control unit 3 may be built in the main body 2.

What is claimed is:

1. An image measuring apparatus comprising:
an imaging unit disposed facing a stage for placing the measurement object and configured to acquire an image of a measurement object;
a displaying unit configured to display the image of the measurement object acquired in the imaging unit;
a feature image specification receiving unit configured to receive specification of any partial image on the displayed image as a feature image;
a measurement position specification receiving unit configured to receive specification of a measurement position of the measurement object, on the displayed image;
a relative position storing unit configured to store the feature image the specification of which is received in the feature image specification receiving unit, and information on a relative position for the feature image, the information representing the measurement position the specification of which is received in the measurement position specification receiving unit and a display position for displaying a dimension line indicating the measurement position;
an attitude and position identifying unit configured to compare an image of the measurement object, the image being newly acquired by the imaging unit, with the stored feature image to identify information on an attitude and a position of the newly acquired image of the measurement object;
an edge portion detecting unit configured to set a measurement position for the image of the measurement object, the image having the attitude and the position identified, based on the information on the relative position of the measurement position for the feature image, the information being stored in the relative position storing unit, and to detect an edge portion at the measurement position;
a measuring unit configured to measure a predetermined physical quantity based on the detected edge portion; and
a measurement result displaying unit configured to display the dimension line indicating the measurement position and a measurement result at a predetermined position based on the information on the relative position for the feature image stored in the relative position storing unit, the information representing the display position of the dimension line, and further comprising a display manner changing unit configured to change a display manner of the measurement result; and wherein the display manner changing unit is configured to change the display manner of the measurement result if it is determined that the measurement result is within the range of the predetermined tolerance.

2. The image measuring apparatus according to claim 1, wherein the relative position storing unit is configured to further store a display position for displaying the measurement result as the information on the relative position for the feature image, and the measurement result displaying unit is configured to display the measurement result at the predetermined position based on the information on the relative position of the display position for displaying the measurement result for the feature image, the information being stored in the relative position storing unit.

3. The image measuring apparatus according to claim 1, further comprising:

a display position changing unit configured to receive a change of the position for displaying the dimension line and/or the measurement result.

4. The image measuring apparatus according to claim 1, further comprising:

a measurement result specification receiving unit configured to receive specification of the measurement result to be an object of determination of whether the measurement result is within a range of a predetermined tolerance; and said display manner changing unit configured to change a display manner of the measurement result the specification of which is received in the measurement result specification receiving unit.

5. The image measuring apparatus according to claim 4, further comprising a measurement result determining unit configured to determine whether the measurement result the specification of which is received in the measurement result specification receiving unit is within the range of the predetermined tolerance; and wherein the display manner changing unit is configured to change the display manner of the measurement result if it is determined in the measurement result determining unit that the measurement result is within the range of the predetermined tolerance.

6. The image measuring apparatus according to claim 1, further comprising a display state determining unit configured to determine whether a portion displayed outside a display range exists in the measurement result; and wherein the measurement result displaying unit is configured to move the display position of the measurement result into the display range so that the measurement result is displayed within the display range, if it is determined in the display state determining unit that the portion displayed outside the display range exists.

7. The image measuring apparatus according to claim 1, further comprising:

a display angle detecting unit configured to detect an inclined angle of the display position of the measurement result; and an inclined angle determining unit configured to determine whether the detected inclined angle is equal to or greater than a predetermined angle; and wherein the measurement result displaying unit is configured to display the measurement result in an upside-down manner if it is determined in the inclined angle determining unit that the inclined angle is equal to or greater than the predetermined angle.

8. The image measuring apparatus according to claim 1, further comprising a measurement result display position storing unit configured to store information on a relative position for the image of the measurement object, the information representing a display position of the displayed dimension line indicating the measurement position and the measurement result, in association with the attitude and the position of the image of the measurement object; and wherein the measurement result displaying unit is configured to change and display the information on the attitude and the position of the image of the measurement object identified in the attitude and position identifying unit based on the information on the relative position for the image of the measurement object stored in the measurement result display position storing unit, the information representing the display position of the dimension line and the measurement result.

9. A computer program that is present on a non-transitory computer medium, said computer program executable with an image measuring apparatus, the computer program causing a computer to realize a function of the image measuring apparatus, the image measuring apparatus comprising:

an imaging unit disposed facing a stage for placing the measurement object and configured to acquire an image of a measurement object;

a displaying unit configured to display the image of the measurement object acquired in the imaging unit;

a feature image specification receiving unit configured to receive specification of any partial image on the displayed image as a feature image;

a measurement position specification receiving unit configured to receive specification of a measurement position of the measurement object, on the displayed image;

a relative position storing unit configured to store the feature image the specification of which is received in the feature image specification receiving unit, and information on a relative position for the feature image, the information representing the measurement position the specification of which is received in the measurement position specification receiving unit and a display position for displaying a dimension line indicating the measurement position;

an attitude and position identifying unit configured to compare an image of the measurement object, the image being newly acquired by the imaging unit, with the stored feature image to identify information on an attitude and a position of the newly acquired image of the measurement object;

an edge portion detecting unit configured to set a measurement position for the image of the measurement object, the image having the attitude and the position identified, based on the information on the relative position of the measurement position for the feature image, the information being stored in the relative position storing unit, and to detect an edge portion at the measurement position;

a measuring unit configured to measure a predetermined physical quantity based on the detected edge portion; and a measurement result displaying unit configured to display the dimension line indicating the measurement position and a measurement result at a predetermined position based on the information on the relative position for the feature image stored in the relative position storing unit, the information representing the display position of the dimension line, and further comprising a display manner changing unit configured to change a display manner of the measurement result; and wherein the display manner changing unit is configured to change the display manner of the measurement result if it is determined that the measurement result is within the range of the predetermined tolerance.

10. The computer program according to claim 9, the computer program causing the computer to realize the function of the image measuring apparatus, wherein the relative position storing unit is configured to further store a display position for displaying the measurement result as the information on the relative position for the feature image, and the measurement result displaying unit is configured to display the measurement result at the predetermined position based on the information on the relative position of the display position for displaying the measurement result for the feature image, the information being stored in the relative position storing unit.

11. The computer program according to claim 9, the computer program causing the computer to realize the function of the image measuring apparatus, the image measuring apparatus further comprising:

a display position changing unit configured to receive a change of the position for displaying the dimension line and/or the measurement result.

12. The computer program according to claim 9, the computer program causing the computer to realize the function of the image measuring apparatus, the image measuring apparatus further comprising:

a measurement result specification receiving unit configured to receive specification of the measurement result to be an object of determination of whether the measurement result is within a range of a predetermined tolerance; and said display manner changing unit configured to change a display manner of the measurement result the specification of which is received in the measurement result specification receiving unit.

13. The computer program according to claim 12, the computer program causing the computer to realize the function of the image measuring apparatus, the image measuring apparatus further comprising:

a measurement result determining unit configured to determine whether the measurement result the specification of which is received in the measurement result specification receiving unit is within the range of the predetermined tolerance; and wherein the display manner changing unit is configured to change the display manner of the measurement result if it is determined in the measurement result determining unit that the measurement result is within the range of the predetermined tolerance.

14. The computer program according to claim 9, the computer program causing the computer to realize the function of the image measuring apparatus, the image measuring apparatus further comprising:

a display state determining unit configured to determine whether a portion displayed outside a display range exists in the measurement result; and wherein the measurement result displaying unit is configured to move the display position of the measurement result into the display range so that the measurement result is displayed within the display range, if it is determined in the display state determining unit that the portion displayed outside the display range exists.

15. The computer program according to claim 9, the computer program causing the computer to realize the function of the image measuring apparatus, the image measuring apparatus further comprising:

a display angle detecting unit configured to detect an inclined angle of the display position of the measurement result; and an inclined angle determining unit configured to determine whether the detected inclined angle is equal to or greater than a predetermined angle; and wherein the measurement result displaying unit is configured to display the measurement result in an upside-down manner if it is determined in the inclined angle determining unit that the inclined angle is equal to or greater than the predetermined angle.

16. The computer program according to claim 9, the computer program causing the computer to realize the function of the image measuring apparatus, the image measuring apparatus further comprising:

a measurement result display position storing unit configured to store information on a relative position for the image of the measurement object, the information representing a display position of the displayed dimension line indicating the measurement position and the measurement result, in association with the attitude and the position of the image of the measurement object; and wherein the measurement result displaying unit is configured to change and display the information on the attitude and the position of the image of the measurement object identified in the attitude and position identifying unit based on the information on the relative position for the image of the measurement object stored in the measurement result display position storing unit, the information representing the display position of the dimension line and the measurement result.

* * * * *